United States Patent
Oumi et al.

(10) Patent No.: US 7,525,880 B1
(45) Date of Patent: Apr. 28, 2009

(54) NEAR-FIELD INFORMATION REPRODUCING APPARATUS AND NEAR-FIELD INFORMATION REPRODUCING METHOD

(75) Inventors: Manabu Oumi, Chiba (JP); Yasuyuki Mitsuoka, Chiba (JP); Norio Chiba, Chiba (JP); Nobuyuki Kasama, Chiba (JP); Kenji Kato, Chiba (JP); Takashi Niwa, Chiba (JP)

(73) Assignee: Seiko Instruments Inc. (JP)

( * ) Notice: Subject to any disclaimer, the term of this patent is extended or adjusted under 35 U.S.C. 154(b) by 0 days.

(21) Appl. No.: 09/581,602

(22) PCT Filed: Oct. 15, 1999

(86) PCT No.: PCT/JP99/05725

§ 371 (c)(1),
(2), (4) Date: Aug. 18, 2000

(87) PCT Pub. No.: WO00/23989

PCT Pub. Date: Apr. 27, 2000

(30) Foreign Application Priority Data

Oct. 19, 1998 (JP) .................................. 10-297377

(51) Int. Cl.
G11B 7/00 (2006.01)

(52) U.S. Cl. ................. 369/13.31; 369/13.3; 369/13.32; 369/44.25; 369/44.26; 369/53.23; 369/110.01; 369/110.04; 369/112.16

(58) Field of Classification Search .............. 369/13.29, 369/13.3, 13.31, 13.33, 44.11, 44.23, 44.25, 369/44.26, 53.2, 53.23, 110.1, 110.4, 112.16, 369/44.2, 112.14, 13.32, 112.18, 11.01, 110.04, 369/53.26; G11B 11/00, 7/00, 5/58, 7/135, G11B 5/08

See application file for complete search history.

(56) References Cited

U.S. PATENT DOCUMENTS 4,084,198 A * 4/1978 Lemelson ..................... 386/68
4,344,164 A * 8/1982 Bricot et al. .............. 369/44.14

(Continued)

FOREIGN PATENT DOCUMENTS

EP 0-376673 * 7/1990

(Continued)

OTHER PUBLICATIONS

MAT (machine assisted translation) JP 10-112075.*

(Continued)

Primary Examiner—Wayne R Young
Assistant Examiner—Linh T Nguyen
(74) Attorney, Agent, or Firm—Adams & Wilks

(57) ABSTRACT

An information reproducing apparatus has a light source for generating linearly polarized light, a medium having linear marks disposed in overlapping relation to one another, and an optical head disposed between the light source and the medium and having a fine aperture. A polarized light control portion in the light source controls the linearly polarized light to pass through the fine aperture of the optical head to generate near-field light having a preselected polarization direction and to irradiate the linear marks of the medium with the near-field light so that the preselected polarization direction of the near-field light is orthogonal to a longitudinal axis of each of the linear marks. A detector detects light scattered by the linear mark irradiated with the near-field light.

26 Claims, 24 Drawing Sheets

U.S. PATENT DOCUMENTS

| | | | | |
|---|---|---|---|---|
| 4,685,807 | A | * | 8/1987 | Picard .................... 356/401 |
| 5,491,678 | A | * | 2/1996 | Maeda et al. ............ 369/59.26 |
| 5,602,820 | A | | 2/1997 | Wickramasinghe et al. . 369/126 |
| 5,615,192 | A | * | 3/1997 | Kikukawa et al. ........ 369/47.17 |
| 5,627,818 | A | * | 5/1997 | Gardner et al. ........... 369/275.4 |
| 5,689,384 | A | * | 11/1997 | Albrecht et al. .......... 360/77.12 |
| 5,689,480 | A | * | 11/1997 | Kino ........................ 369/14 |
| 5,734,632 | A | * | 3/1998 | Ito et al. .................. 369/44.23 |
| 5,754,514 | A | * | 5/1998 | Guerra ..................... 369/116 |
| 5,881,214 | A | * | 3/1999 | Morisawa et al. ......... 358/1.18 |
| 5,894,350 | A | * | 4/1999 | Hsieh et al. ............... 356/399 |
| 5,910,940 | A | * | 6/1999 | Guerra ..................... 369/275.1 |
| 5,963,532 | A | * | 10/1999 | Hajjar ...................... 369/112.24 |
| 6,055,220 | A | | 4/2000 | Mamin et al. ............ 369/13.13 |
| 6,094,413 | A | * | 7/2000 | Guerra ..................... 369/275.1 |
| 6,115,348 | A | * | 9/2000 | Guerra ..................... 369/112.26 |
| 6,147,959 | A | * | 11/2000 | Ohyama ................... 369/126 |
| 6,160,769 | A | * | 12/2000 | Ohnuki et al. ............ 369/13.13 |
| 6,249,507 | B1 | * | 6/2001 | Guerra ..................... 369/275.1 |
| 6,298,018 | B1 | * | 10/2001 | Takahashi et al. ........ 369/44.23 |
| 6,487,148 | B1 | * | 11/2002 | Hsieh ....................... 369/47.1 |

FOREIGN PATENT DOCUMENTS

| | | | |
|---|---|---|---|
| EP | 0-552887 | * | 7/1993 |
| EP | 0594193 | | 4/1994 |
| JP | 09128787 A | * | 5/1997 |
| JP | 10-112075 | * | 4/1998 |

OTHER PUBLICATIONS

Higgens D A et al: "Polarization-modulation near-field scanning optical microscopy of mesostructured materials" J. Phys. Chem (USA), Journal of Physical Chemistry, Aug. 8, 1996, ACS, USA, vol. 100, No. 32, 1996, pp. 13794-13803, XP002289473 issn: 0022-3654.

Higgins D A et al: "Polarization-modulation near-field scanning optical microscopy of mesostructured materials" J. Phys. Chem (USA), Journal of Physical Chemistry, Aug. 8, 1996, ACS, USA, vol. 100, No. 32, 1996, pp. 13794-13803, XP002289473 issn: 0022-3654.

Patent Abstracts of Japan, vol. 1995, No. 10, Nov. 30, 1995 publication No. JP 07 192280 A, publication date Jul. 28, 1995.

* cited by examiner

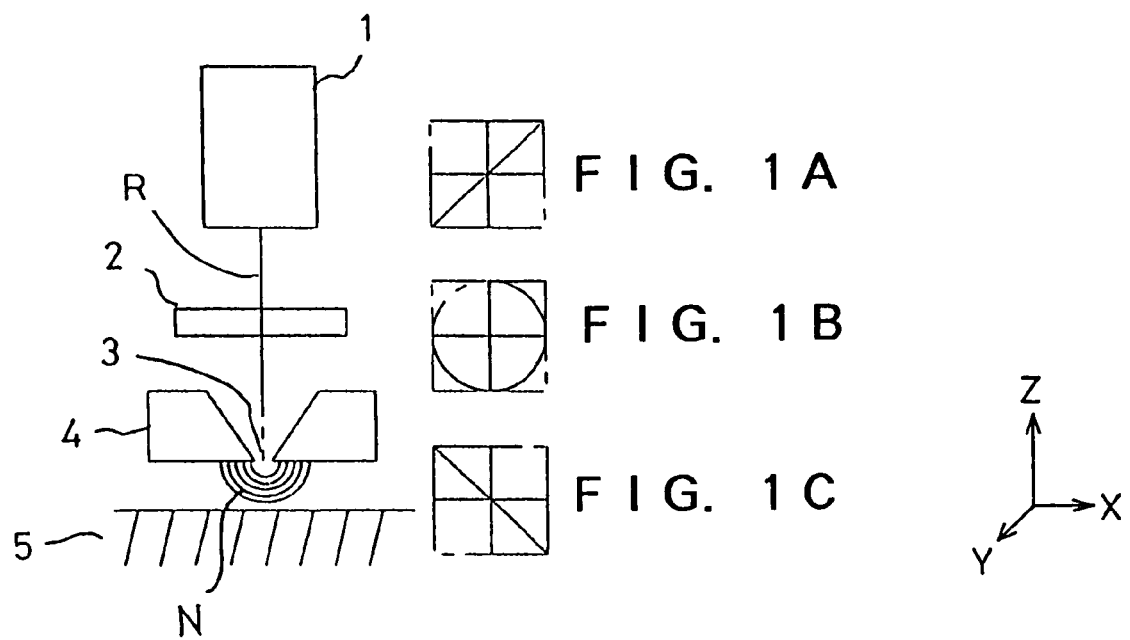
FIG. 1A
FIG. 1B
FIG. 1C
FIG. 2
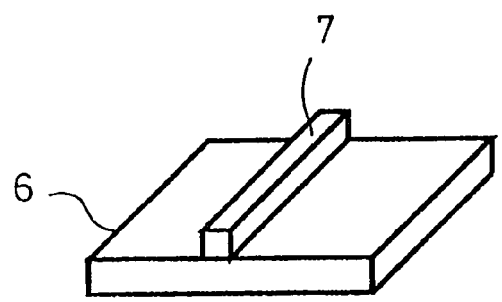

F I G. 3 A
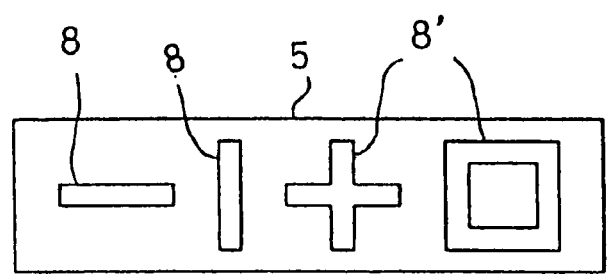
F I G. 3 B
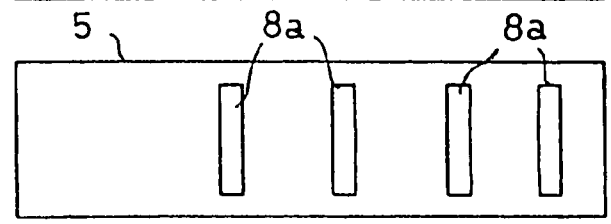
F I G. 3 C
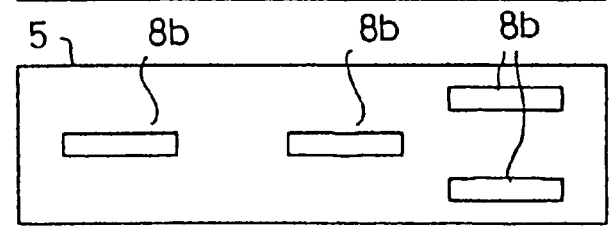

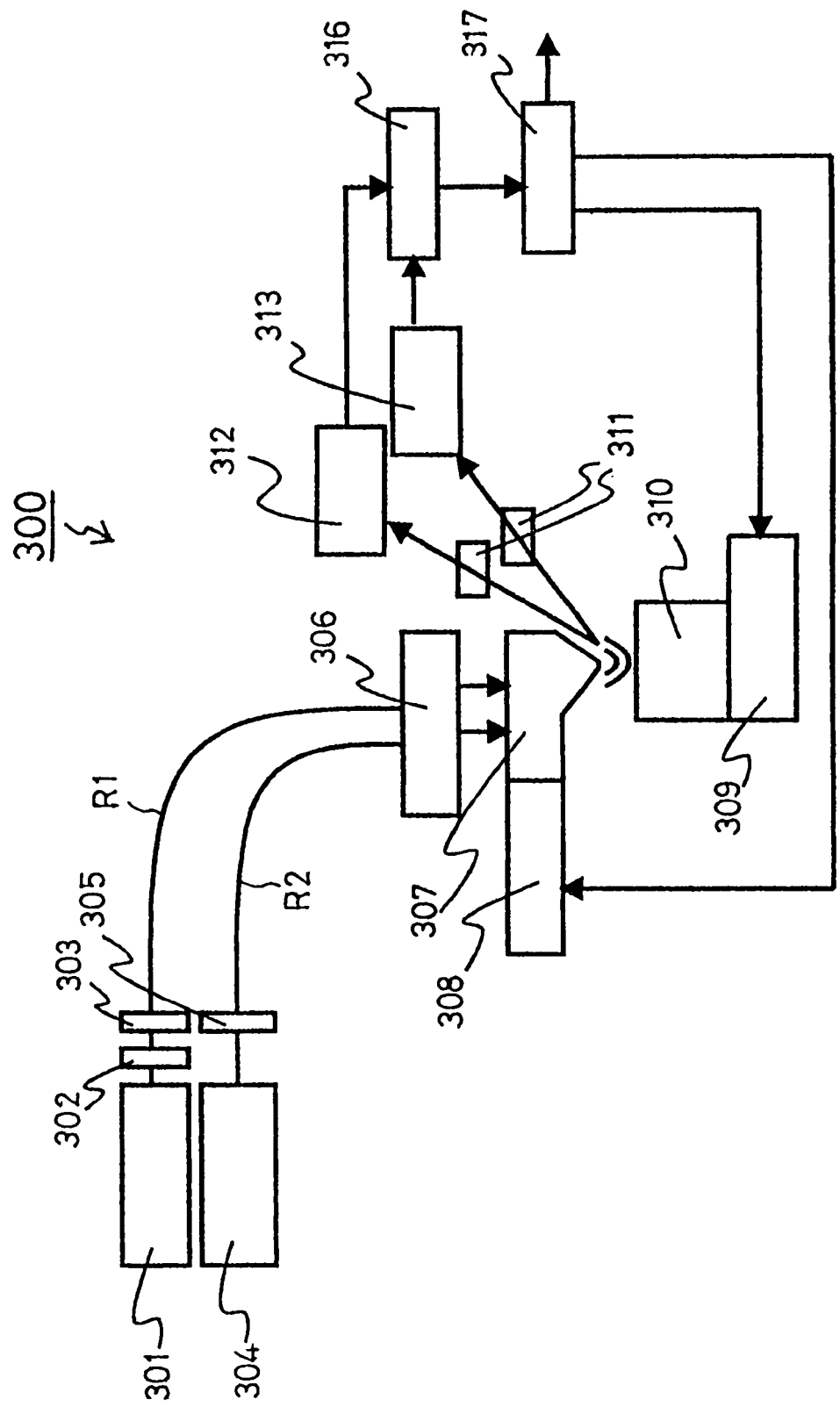

F I G. 1 1
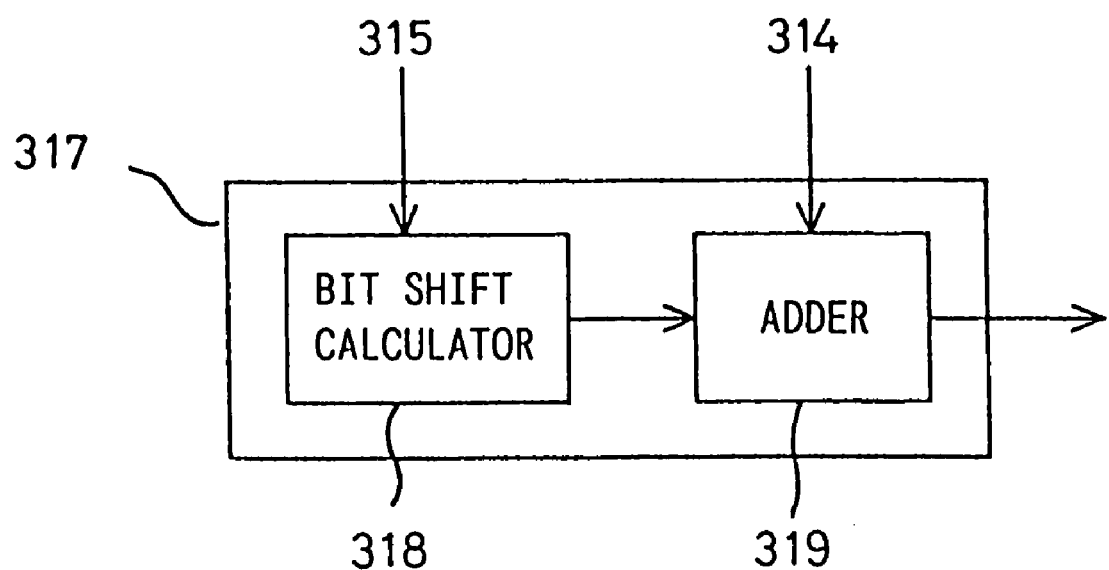

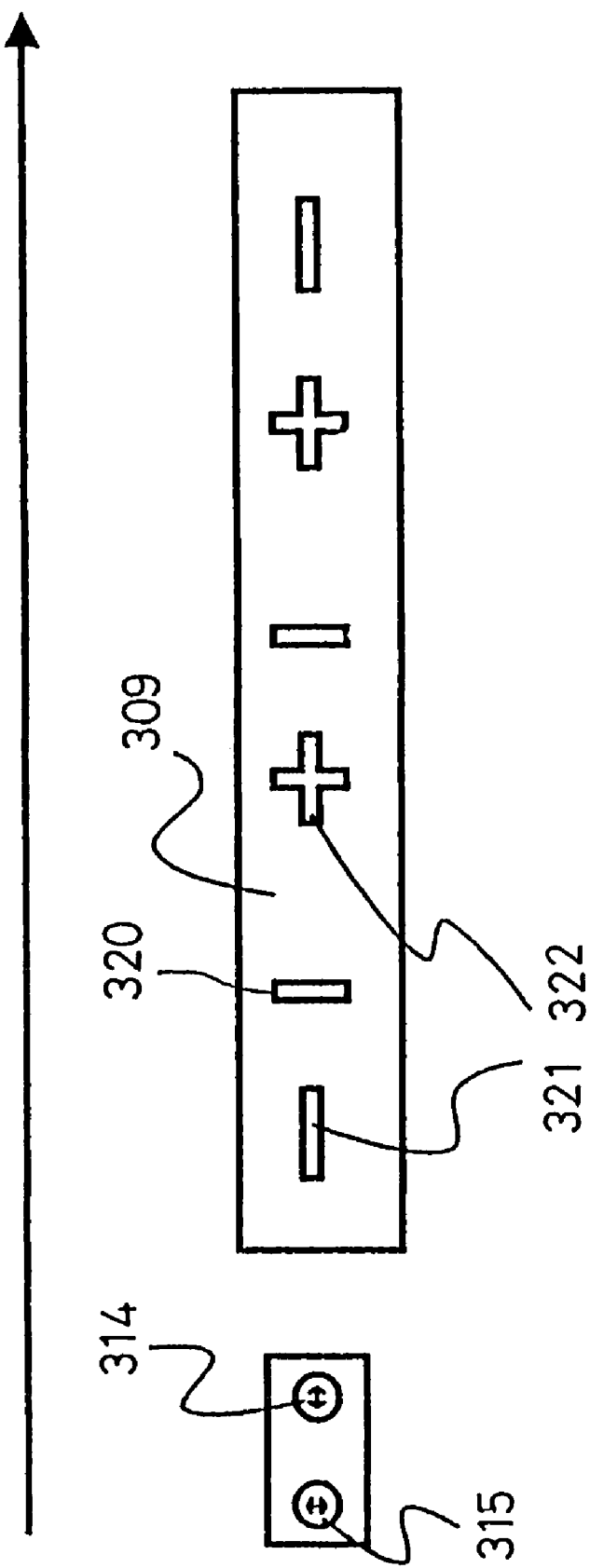

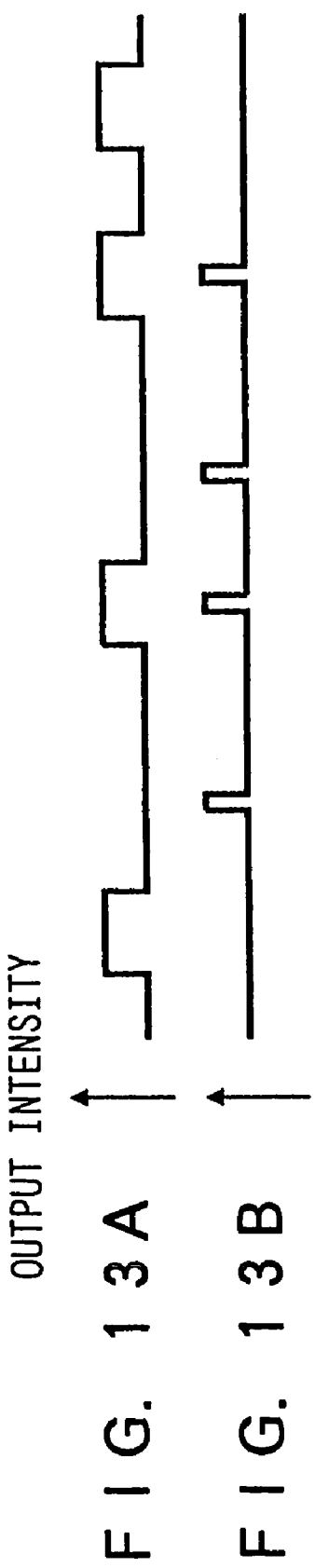

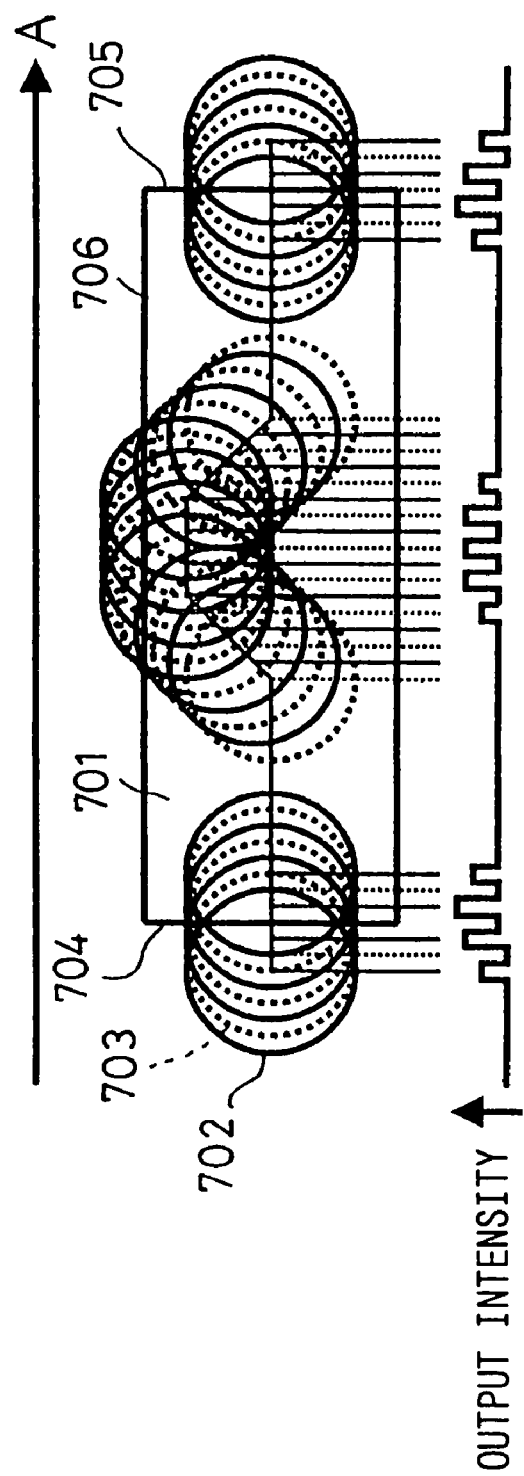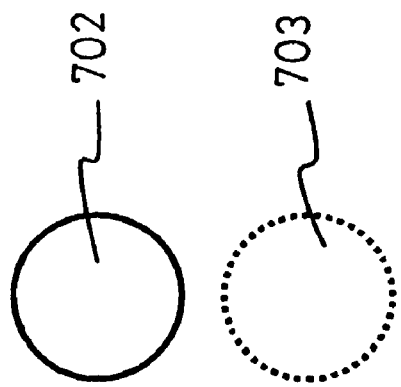

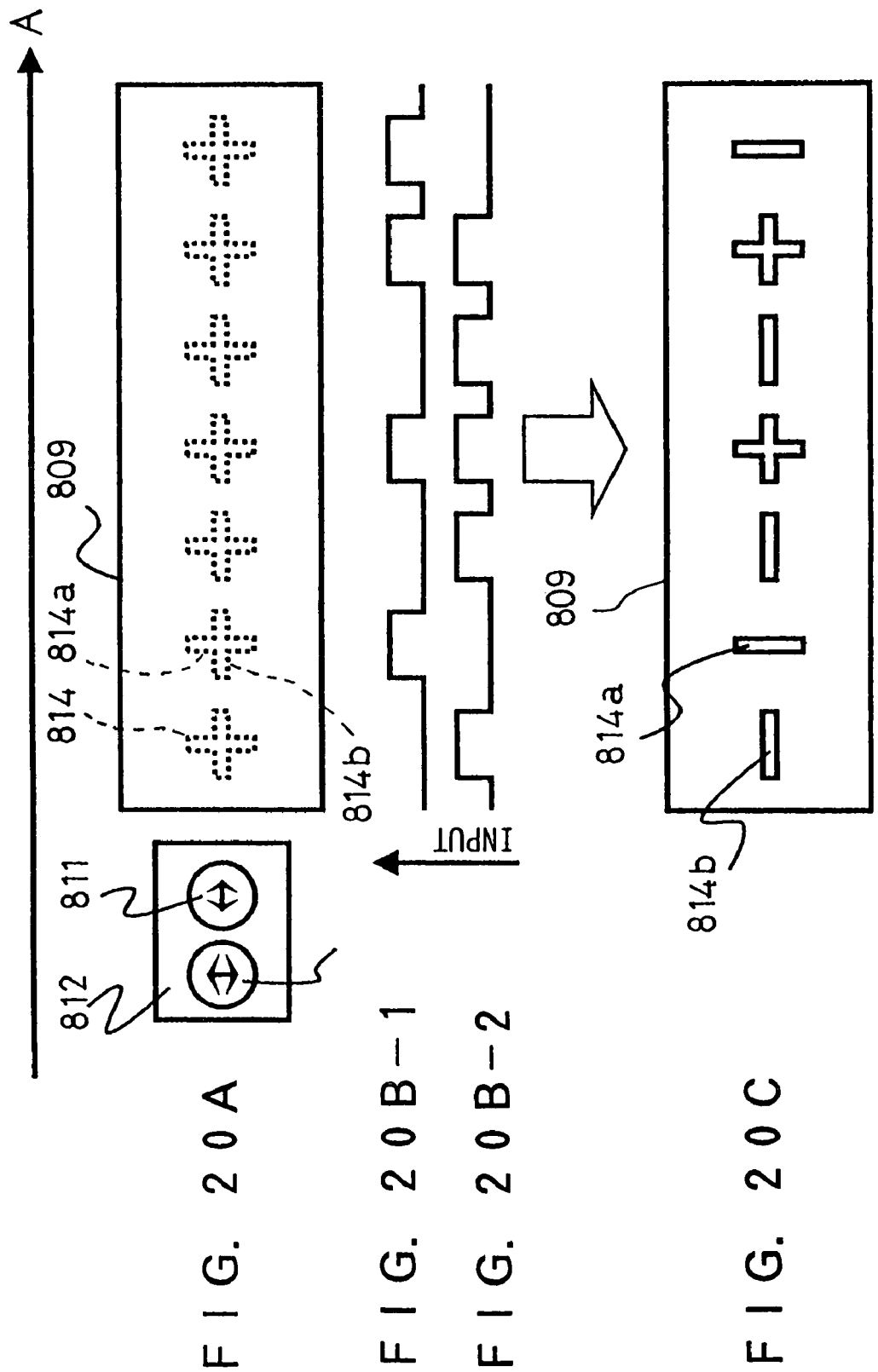

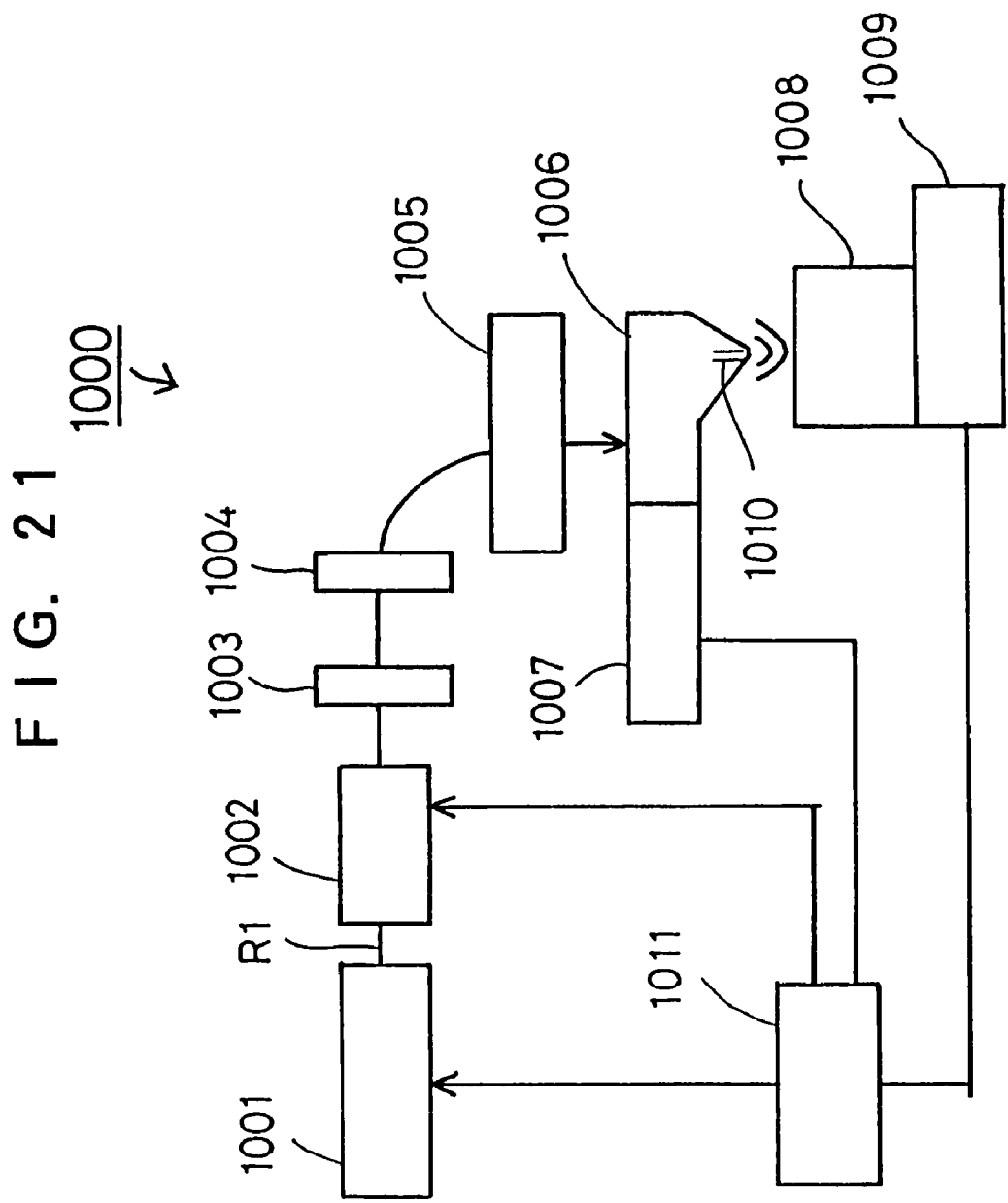

F I G. 2 2
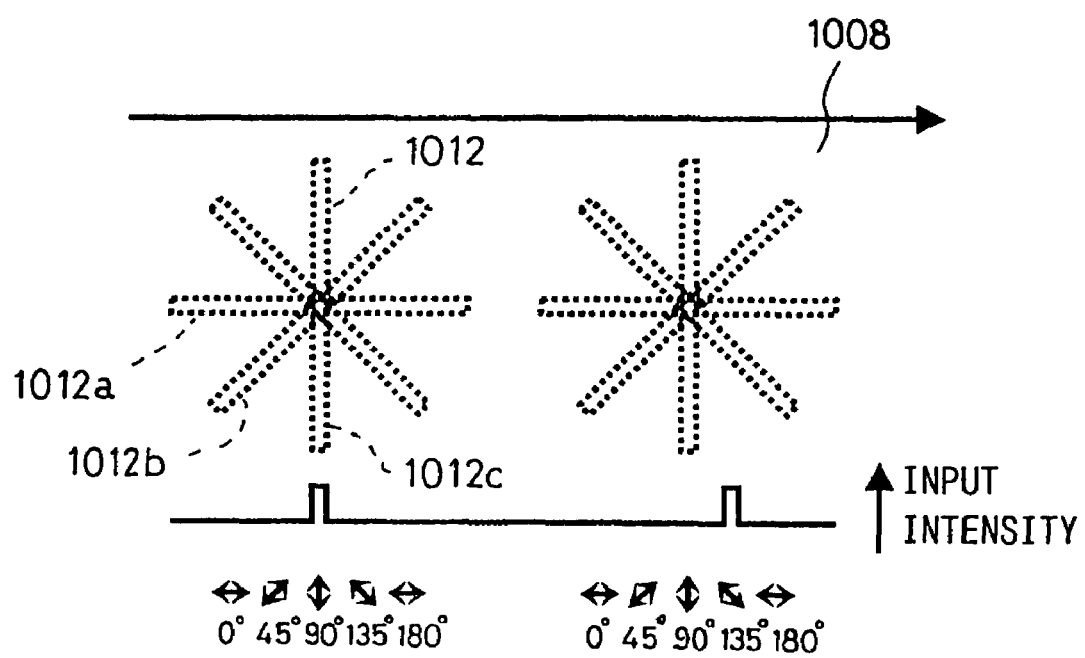
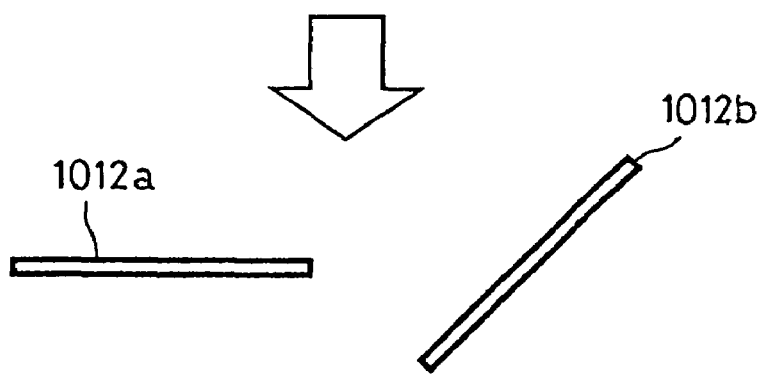

FIG. 23
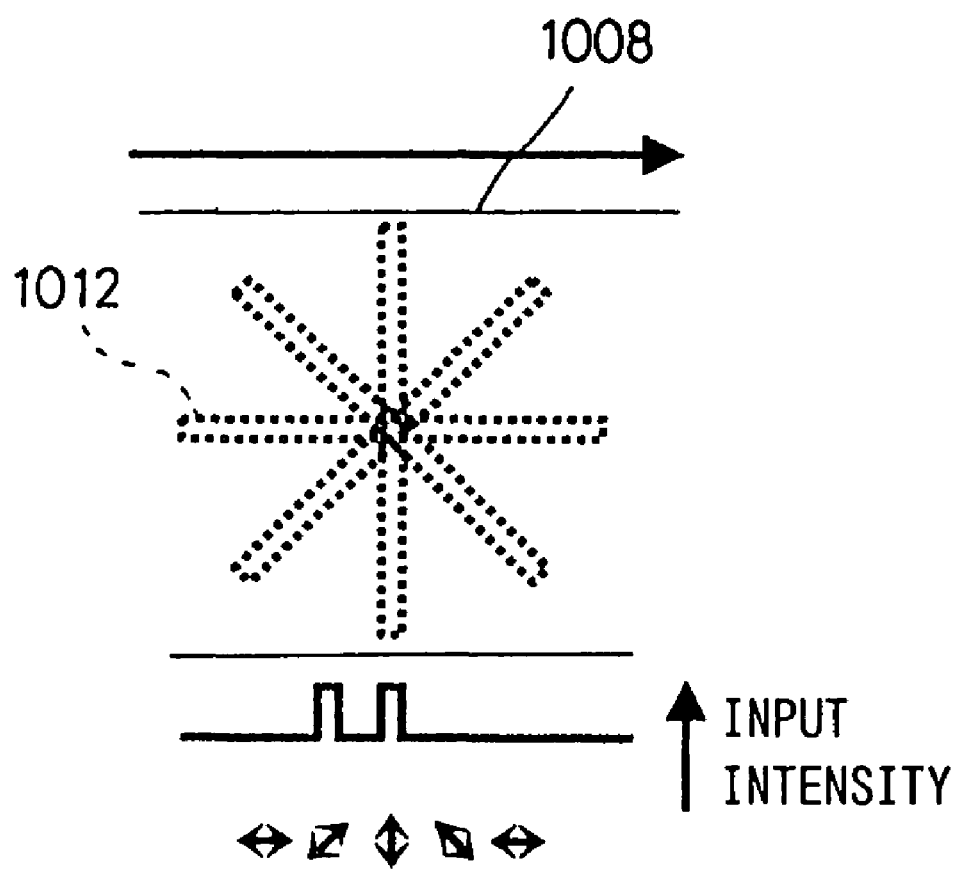
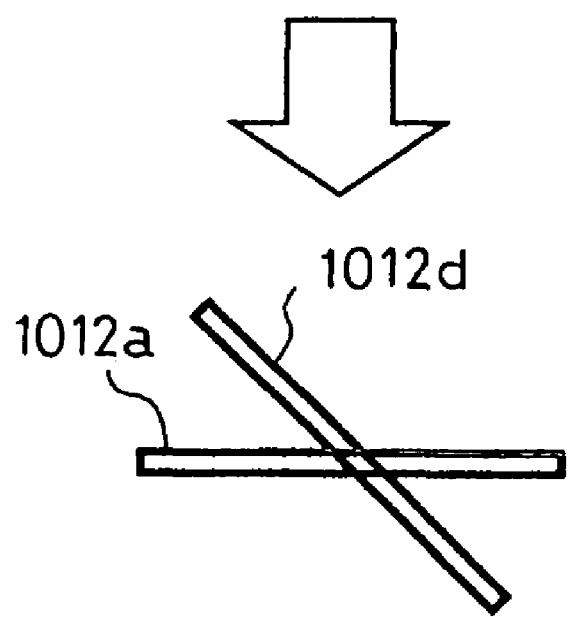

NEAR-FIELD INFORMATION REPRODUCING APPARATUS AND NEAR-FIELD INFORMATION REPRODUCING METHOD

CROSS-REFERENCE TO RELATED APPLICATIONS

This application is a U.S. national stage application of copending International Application Ser. No. PCT/JP99/05725, filed Oct. 15, 1999 claiming a priority date of Oct. 19, 1998, and published in a non-English language.

BACKGROUND OF THE INVENTION

1. Field of the Invention

The present invention relates to an information reproducing apparatus and an information recording apparatus capable of further promoting a recording density by using a reproducing and recording system using near-field light, and to a recording medium, an information reproducing method and an information recording method used in information reproduction or recording utilizing near-field light.

2. Background of the Information

In recent years, the promotion of a recording density of information reproducing/recording apparatus starting from a hard disk apparatus has lost interest and there is now an interest for a new reproducing and recording system in place of an existing system in order to promote the recording density. At present, as a technology for outstandingly promoting such a recording density, there has been proposed an information reproducing system using near-field light of which has already been reduced into practice in the United States.

Near-field light is provided with a high resolution equal to or higher than the diffraction limit of light and, accordingly, a pit on an information recording medium can be made further smaller than that in a conventional system. Therefore, the recording density can be increased up to several tens G bits/square inch. According to the system, the recording density does not depend on the wavelength of light but on the very small shape or size at a front end of a head.

However, even in the case of the information reproducing/recording apparatus using near-field light, the head is controlled such that the head is not shifted from a row of data marks and accordingly, it is necessary to provide tracking marks on the recording medium. The tracking marks do not hold data and accordingly, there poses a problem in which the data marks are eroded by an amount of the tracking marks, constituting a hazard in high density formation.

Further, by a single data mark, in principle, information other than "0" and "1" cannot be expressed and therefore, there poses a problem in which there is a limit in high density formation by a unit of the data mark.

Hence, the invention has been carried out in view of the above-described and it is an object thereof to provide an information reproducing apparatus and an information recording apparatus capable of further promoting a recording density by using a reproducing and recording system using near-field light as well as a recording medium, an information reproducing method and an information recording method used in information reproduction or recording utilizing near-field light.

SUMMARY OF THE INVENTION

In order to achieve the above-described object, according to an embodiment of the invention, there is provided an information reproducing apparatus for forming a mark of an edge in a linear shape having a predetermined angle relative to a scanning direction or the like on a medium, irradiating the mark with near-field light of linearly polarized light orthogonal to the mark, and acquiring scattered light scattered by the mark as an output signal.

Comparing the case in which the near-field light having the linearly polarized light is irradiated on the edge formed in a direction in parallel with the linearly polarized light with the case in which the near-field light is irradiated on the edge formed in a direction orthogonal to the linearly polarized light, the latter can be provided with stronger scattered light. According to the invention, information is reproduced by using the principle. That is, by irradiating the mark on the medium with the near-field light of the linearly polarized light orthogonal to the mark, the stronger scattered light can be provided and accordingly, the scattered light is used for the output signal. Under the constitution, only the mark in the direction orthogonal to the linearly polarized light in a specific direction generates strong scattered light and accordingly, even when a plurality of marks having different directions are formed at the same position, the respective marks can separately be detected. Therefore, a single pit can be loaded with multiple value data and accordingly, the recording density is promoted.

Further, according to another embodiment, there is provided an information reproducing apparatus for forming a plurality of marks of edges in a linear shape or the like on a medium by changing directions of the marks, scanning the medium while irradiating the marks with near-field light of linearly polarized light, constituting output signals by scattered light scattered by the marks, and acquiring multiple value data from intensities of the output signals.

In the case in which the mark is irradiated with the near-field light of the linearly polarized light, when the mark is orthogonal to the direction of polarization of the near-field light, the near-field light is scattered and the output signal is intensified. Conversely, when the mark is in a direction different from the direction orthogonal to the direction of polarization of the near-field light, the output signal stays to be low. That is, when the near-field light having one direction of polarization is irradiated, only a specific mark (in a direction orthogonal to the direction of polarization) can be detected. Therefore, even in the case in which a plurality of the marks in the linear shape are formed at the same position on the medium while changing directions thereof, when the near-field light having the linearly polarized light orthogonal to the respective marks is irradiated, the respective output signals can be provided from the respective marks. Therefore, even when the marks are formed at the same position, the marks can be separately detected and accordingly, the recording density can be promoted by that amount.

Further, according to another embodiment, there is provided an information reproducing apparatus comprising a tracking mark of an edge in a linear shape or the like formed on a medium in a scanning direction, and a very small aperture for tracking for scanning a vicinity of the tracking mark along the tracking mark and generating near-field light polarized in a direction orthogonal to the scanning direction by receiving light from a light source, wherein an output signal is acquired from scattered light scattered by the tracking mark and tracking in reproduction is executed based on an intensity of the output signal.

When the very small aperture for tracking is separated from the tracking mark, the scattered light of the near-field light by the tracking mark is reduced and accordingly, the output signal is weakened by that amount. Further, when the very small aperture for tracking approaches the tracking mark, the scattered light of the near-field light by the tracking mark is increased and accordingly, the output signal is intensified by that amount. In this way, control of tracking can be carried out by strong or weak of the output signal. Further, when the tracking mark is provided in a direction different from that of the data mark, the tracking mark and a data mark can be separated from each other owing to the above-described property. Therefore, the tracking mark and the data mark can be formed at the same position.

Further, according to another embodiment, there is provided an information reproducing apparatus comprising a tracking mark of an edge in a linear shape or the like formed on a medium in a scanning direction, a data mark of an edge in a linear shape or the like formed in a direction orthogonal to the scanning direction, a very small aperture for data access for orthogonally scanning the data mark and generating near-field light polarized in the scanning direction by receiving light from a light source, and a very small aperture for tracking for scanning a vicinity of the tracking mark along the tracking mark and generating near-field light polarized in the direction orthogonal to the scanning direction by receiving light from a light source, wherein an output signal is acquired from scattered light scattered by the tracking mark, tracking is executed based on an intensity of the output signal, an output signal is acquired from scattered light scattered by the data mark and data is acquired based on an intensity of the output signal.

Tracking thereof is similar to that in the invention according to the last described embodiment. With regard to data access, the data mark is formed in the direction orthogonal to the scanning direction, that is, a direction different from that of the tracking mark and is scanned by the near-field light of the linearly polarized light orthogonal to the data mark. In this way, even when the data mark and the tracking mark are formed on the same track, or even when a single pit is formed by the tracking mark and the data mark, the two marks can be separately detected. As a result, an area of the tracking mark (or data mark) can be reduced and accordingly, the recording density can be promoted.

Further, according to another embodiment, there is provided an information reproducing apparatus comprising a very small aperture for first data access for generating near-field light polarized in a scanning direction by receiving light from a light source, a very small aperture for second data access for generating near-field light polarized in a direction orthogonal to the scanning direction by receiving light from a light source, and a data mark of an edge or the like formed in the scanning direction and/or the direction orthogonal to the scanning direction based on recorded information, wherein the near-field light polarized in the scanning direction by the very small aperture for the first data access is scattered by a data mark formed in the direction orthogonal to the scanning direction, first data is acquired based on an intensity of light scattered thereby, similarly, the near field light polarized in the direction orthogonal to the scanning direction by the very small aperture for the second data access is scattered by a data mark formed in the scanning direction, second data is acquired based on an intensity of light scattered thereby and multiple value data is acquired from the first data and the second data.

According to the invention, the multiple value data is acquired from the data mark formed in the scanning direction and the data mark formed in the direction orthogonal to the scanning direction. The near-field light generated from the very small aperture for the first data mark is provided with the direction of polarization in the scanning direction and therefore, strong scattered light is generated by the data mark orthogonal to the scanning direction. Therefore, data of 2 bits can be provided from presence or absence of such a data mark. Further, the near-field light generated from the very small aperture for the second data mark is polarized in the direction orthogonal to the scanning direction and therefore, strong scattered light is generated by the data mark in the scanning direction. Therefore, similar to the above-described, the data of 2 bits can be provided from presence or absence of such a data mark.

In this way, when the data marks formed in different directions are irradiated with the near-field light having the linearly polarized light in directions orthogonal to the respective data marks, the respective data marks can be separately detected from the above-described characteristic. Therefore, the respective data marks can be formed at the same position as a unit pit and accordingly, multiple value formation of data is made feasible.

Further, according to another embodiment, there is provided an information reproducing apparatus comprising one very small aperture for data access for generating near-field light having linearly polarized light by receiving light from a light source, polarized light rotating means provided between the light source and the very small aperture for data access for rotating a direction of polarization of the near-field light, and a data mark of an edge or the like formed in the scanning direction and/or a direction orthogonal to the scanning direction based on recorded information, wherein the data mark is scanned by the near-field light polarized in the scanning direction or the direction orthogonal to the scanning direction, successively, the same data mark is scanned by the near-field light polarized in the direction orthogonal to the scanning direction or the scanning direction, the near-field light polarized in the scanning direction is scattered by the data mark formed in the direction orthogonal to the scanning direction, first data is acquired based on an intensity of the scattered light, similarly, the near-field light polarized in the direction orthogonal to the scanning direction is scattered by the data mark formed in the scanning direction, second data is acquired based on an intensity of the scattered light and multiple value data is acquired from the first data and the second data.

According to the invention, in view of the fact that when the data marks are irradiated with the near-field light of the linearly polarized light orthogonal to the data marks, strong scattered light is provided, the data marks are formed in the scanning direction and/or the direction orthogonal to the scanning direction and the near-field light of the linearly polarized light is irradiated by changing the direction of polarization. First, the data mark in the scanning direction is irradiated with the near-field light of the linearly polarized light orthogonal to the scanning direction to thereby provide the output signal. Next, the data mark in the direction orthogonal to the scanning direction is irradiated with the near-field light having the linearly polarized light in the scanning direction by rotating the direction of polarization to thereby provide the output signal. In this way, the respective data marks can separately be detected and accordingly, the respective data marks can be formed as a unit pit and multiple value formation of data can be executed. Further, the direction of polarization of the near-field light is rotated by the polarized light rotating means and accordingly, the light source and the very small aperture for data access can be constituted by one route and accordingly, the apparatus structure is simplified.

Further, according to another embodiment, there is provided an information reproducing apparatus according to the above described information reproducing apparatus, further comprising bit shift operating means for subjecting either one of the first data and the second data to bit shift and adding the either one to other thereof.

The bit shift operating means executes bit shift of the first data (for example, 2 bits) by the data mark in the scanning direction and the second data (for example, 2 bits) by the data mark in the direction orthogonal to the scanning direction. For example, by shifting the first data and adding the first data to the second data, multiple value recording of 4 bits is made possible.

Further, according to another embodiment, there is provided an information reproducing apparatus comprising a data mark of an edge in a linear shape having a predetermined angle relative to a scanning direction or the like formed on a medium, a very small aperture for generating near-field light having linearly polarized light by receiving light from a light source, polarized light rotating means provided between the light source and the very small aperture for rotating a direction of polarization of the near-field light, wherein the medium is scanned while irradiating the data mark with the near-field light a direction of polarization of which is rotating, scattered light scattered by the data mark constitutes an output signal and multiple value data is acquired from an intensity of the output signal and a rotational angle of the direction of polarization.

In the case in which the data mark is irradiated with the near-field light while rotating the direction of polarization of the near-field light, when the direction of polarization is orthogonal to the data mark, the scattered light is increased and accordingly, the strong output signal is provided. That is, by determining presence or absence of the data mark at every predetermined rotational angle, the multiple value data can be acquired from the rotational angle and the intensity of the output signal.

Specifically, when the direction of polarization is rotated from the scanning direction by 45 degrees, strong scattering is effected by the data mark orthogonal to the direction of polarization. Therefore, at the rotational angle of 45 degrees, data of 2 bits can be provided from presence or absence of the data mark. Next, even in the case in which the direction of polarization is rotated from the scanning direction by 135 degrees, strong scattering is effected by data mark orthogonal to the direction of polarization and accordingly, at the rotational angle of 135 degrees, data of 2 bits can be provided from presence or absence of the data mark. The respective data can constitute multiple value data by executing bit shift. In this way, when directions of forming the data marks differ, the data marks can be detected separately in accordance with directions of polarization of the near-field light and accordingly, the data marks can be formed as a unit pit. Further, the direction of polarization of the near-field light is rotated by the polarized light rotating means and accordingly, the light source and the very small aperture can be constituted by one route and accordingly, the apparatus structure is simplified. Further, the direction of polarization of the near-field light needs to rotate at least by 180 degrees on the unit pit.

Further, according to another embodiment, there is provided an information reproducing apparatus forming data marks of edges in a linear shape or the like on a medium at predetermined intervals based on recorded information, scanning the medium while irradiating the data marks with near-field light having linearly polarized light orthogonal to the data marks and acquiring data from intervals of intensities of output signals by scattered light scattered by the data marks.

When the data marks are irradiated with the near-field light having the linearly polarized light in directions orthogonal to the data marks, the near-field light is strongly scattered by the data marks and therefore, the large output signals can be provided. The data marks are formed at the predetermined intervals based on recorded information and therefore, information can be acquired from the intervals of the intensities of the output signals. The data marks are formed in the linear shape and accordingly, the data marks can be formed on the medium by a number larger than that of conventional pits substantially in an elliptic shape.

Further, according to another embodiment, there is provided an information reproducing apparatus providing data marks of a plurality of edges directed in different directions or the like as one unit, the information reproducing apparatus comprising a very small aperture for generating near-field light having linearly polarized light by receiving light from a light source, and polarized light rotating means provided between the light source and the very small aperture for rotating a direction of polarization of the near-field light, wherein the one unit of the plurality of data marks is irradiated with the near-field light the direction of polarization of which is rotating, scattered light scattered by the respective data marks constitutes output signals and multiple value data is acquired from intensities of the output signals and rotational angles of the direction of polarization.

The information reproducing apparatus according to this embodiment is substantially similar to the invention according to the previously described embodiment except that the data marks are provided with a plurality of the data marks directed in different directions as one unit. When there is a relative relationship between the data mark formed in one direction and the near-field light of the linearly polarized light orthogonal to the data mark, an influence is not effected by the data mark formed in other direction and even in the case of the data marks formed in a plurality of directions, these can be separately detected. Further, an optical system is simplified by rotating the direction of polarization. Finally, multiple value data is acquired from the rotational angles and intensities of the output signals. In the case of the constitution, even when the data marks are formed by one unit, the data marks can separately be detected and accordingly, multiple value formation is made possible. Further, in an actual multiple value formation stage, the above-described bit shift means or the like can be used.

Further, according to another embodiment, there is provided an information recording apparatus changing a direction of polarization of near-field light having linearly polarized light based on recorded information and irradiating a medium a surface of which is provided with a substance a state of which is changed by local heating with the near-field light to thereby record multiple value data.

When the substance the state of which is changed by local heating, for example, a phase change film or the like is irradiated with the near-field light having the linearly polarized light, the state of the phase change film is changed in the direction orthogonal to the linearly polarized light. Specifically, the phase of the surface of the phase change film is changed from a crystalline state to a noncrystalline state or vice versa. Therefore, when the direction of the linearly polarized light differs the direction of the state change also differs and accordingly, the state can be changed by different directions at the same position. Although conventionally, only 2 values data can be recorded at the same position, according to the system, by changing the direction of the linearly polarized light, multiple value data can be recorded at the same position. Further, reproduction uses a difference of reflectivities of the crystalline portion and the noncrystalline portion.

Further, according to another embodiment, there is provided an information recording apparatus comprising a very small aperture for first data recording for generating near-field light polarized in a scanning direction by receiving light from a light source, a very small aperture for second data recording for generating near-field light polarized in a direction orthogonal to the scanning direction by receiving light from a light source, and a medium a surface of which is provided with a substance a state of which is changed by local heating, wherein first data is recorded by irradiating the medium with the near-field light polarized in the scanning direction by the very small aperture for the first data recording and changing the state in the direction orthogonal to the scanning direction, similarly, second data is recorded by irradiating the medium with the near-field light polarized in the direction orthogonal to the scanning direction by the very small aperture for the second data recording and changing the state in the scanning direction to thereby record information by multiple value data.

Similar to the above-described, when the medium is irradiated with the near-field light polarized in the scanning direction, the state of the medium is changed in the direction orthogonal to the direction of polarization. Similarly, when the medium is irradiated with the near-field light polarized in the direction orthogonal to the scanning direction, the state of the medium is changed in the scanning direction. In this way, the first data and the second data can be formed at the same position and therefore, multiple value formation is made possible.

Further, according to another embodiment, there is provided an information recording apparatus comprising one very small aperture for data recording for generating near-field light having linearly polarized light by receiving light from a light source, polarized light rotating means provided between the light source and the very small aperture for data recording for rotating a direction of polarization of the near-field light, and a medium a surface of which is provided with a substance a state of which is changed by local heating, wherein first data is recorded by irradiating the medium with the near-field light polarized in a scanning direction or a direction orthogonal to the scanning direction by the very small aperture for data recording and changing the state in the direction orthogonal to the scanning direction or the scanning direction, successively, second data is recorded by irradiating the medium with the near-field light polarized in the direction orthogonal to the scanning direction or the scanning direction and changing the state in the scanning direction or the direction orthogonal to the scanning direction to thereby record information by multiple value data.

According to the invention, information is recorded by rotating the direction of polarization of the near-field light. That is, the state of the substance on the medium is changed by the direction orthogonal to the direction of polarization of the near-field light. Hence, the medium is irradiated with the near-field light polarized in the scanning direction to thereby change the state in the direction orthogonal thereto, successively, the direction of polarization is rotated, the medium is irradiated with the near-field light having the linearly polarized light in the direction orthogonal to the scanning direction to thereby change the state in the direction orthogonal thereto (the state may be changed in the scanning direction by irradiating the medium with the near-field light polarized in the direction orthogonal to the scanning direction and successively, the medium may be irradiated with the near-field light having the linearly polarized light in the scanning direction by rotating the direction of polarization to thereby change the state in the direction orthogonal thereto). In this way, the first data and the second data can be recorded at the same position and therefore, multiple value formation is made possible.

Further, according to another embodiment, there is provided an information recording apparatus comprising one very small aperture for data recording for generating near-field light having linearly polarized light by receiving light from a light source, polarized light rotating means provided between the light source and the very small aperture for data recording for rotating a direction of polarization of the near-field light, and a medium a surface of which is provided with a substance a state of which is changed by local heating, wherein irradiation of the near-field light is controlled by a unit of a predetermined rotational angle based on recorded information and the state in a direction orthogonal to the direction of polarization of the near-field light is changed by the unit of the rotational angle to thereby record information by multiple value data.

The direction of changing the state of the medium differs according to the direction of polarization of the near-field light and accordingly, by irradiating the near-field light by controlling to rotate the direction of polarization, a plurality of data can be recorded at the same position. For example, in the case of recording by a unit of 45 degrees, data of 2 bits can be recorded in 4 directions and accordingly, a total of 8 bits of data can be recorded.

Further, according to another embodiment, there is provided an information recording apparatus according to the above described information recording apparatus, wherein the unit of the rotational angle is made to be equal to or larger than 10 degrees.

According to the above-described information recording apparatus, theoretically, data can be recorded by dividing 180 degrees in a unit of 1 degree or smaller, however, actually, it is pertinent to constitute a unit of 10 degrees or more in consideration of physical properties or resolution of the medium since the state on the medium is changed.

Further, according to another embodiment, there is provided an information reproducing apparatus comprising a first laser oscillator used for tracking, a second laser oscillator used for data access, a phase plate for providing phase shift between the first laser oscillator and the second laser oscillator, a first very small aperture for generating near-field light having linearly polarized light from laser light from the first laser oscillator, and a second very small aperture for generating near-field light having linearly polarized light in a direction orthogonal to a direction of polarization of the near-field light generated by the first very small aperture from laser light from the second laser oscillator.

The laser light oscillated by the first laser oscillator is made incident on the first very small aperture and becomes the near-field light for tracking. The laser light oscillated by the second laser oscillator is made incident on the second very small aperture and becomes the near-field light for data access. Directions of polarization of two of the near-field light are made different from each other by the phase plate provided in an optical path. Meanwhile, it is known that the near-field light is strongly scattered by an edge in a direction orthogonal to the direction of polarization. Thereby, when near-field light linearly polarized in one direction scans an edge in a direction orthogonal thereto, strong scattered light is provided. In contrast thereto, even when near-field light having linearly polarized light in a direction same as that of the edge is irradiated, strong scattered light cannot be provided from the edge. Therefore, with regard to a medium formed with marks of edges or the like respectively in different directions, one of the marks can be used for tracking and other thereof can be used for data access and for that purpose, directions of polarization of near-field light generated from 2 routes of optical systems must be different from each other. Although promotion of the recording density is as described above, in order to provide such an effect, there is needed an information reproducing apparatus having the above-described constitution.

Further, according to another embodiment, there is provided an information reproducing apparatus comprising a first laser oscillator and a second laser oscillator used for data access, a phase plate for providing phase shift between the first laser oscillator and the second laser oscillator, a first very small aperture for generating near-field light having linearly polarized light from laser light from the first laser oscillator, and a second very small aperture for generating near-field light having linearly polarized light in a direction orthogonal to a direction of polarization of the near-field light generated by the first very small aperture from laser light from the second laser oscillator.

When phase shift is produced between the first laser oscillator and the second laser oscillator, directions of polarization of the near-field light generated from the first very small aperture and the second very small aperture differ from each other. From the above-described principle, by scanning by near-field light linearly polarized in one direction, an edge in a direction orthogonally thereto, strong scattered light can be provided. In contrast thereto, strong scattering cannot be provided even by irradiating the edge with near-field light having linearly polarized light in a direction the same as that of the edge. Therefore, with regard to a medium formed with marks of edges or the like in different directions, for separately detecting the marks to thereby provide multiple value data, directions of polarization of near-field light generated from 2 routes of optical systems must be different from each other.

According to the invention, phase shift is provided between the first laser oscillator and the second laser oscillator and directions of polarization of generated near-field light are made different from each other. When respectives of linearly polarized light of near-field light are orthogonal to data marks formed on a record medium, strong scattered light is provided. That is, 2 bits of data can be acquired by an optical system of the first laser oscillator and 2 bits of data can be acquired by an optical system of the second laser oscillator and accordingly, finally, by subjecting the two data to the bit shift, multiple value data can be acquired.

Further, according to another embodiment, there is provided an information reproducing apparatus comprising a laser oscillator used for data access, a very small aperture for generating near-field light having linearly polarized light from laser light from the laser oscillator, and polarized light controlling means for controlling a direction of polarization of the near-field light.

The direction of polarization of the laser light of the laser oscillator can be rotated by the polarized light rotating means. When near-field light polarized in one direction scans an edge in a direction orthogonally thereto, strong scattered light can be provided. In contrast thereto, even when the edge is irradiated with near-field light having linearly polarized light in a direction the same as that of the edge, strong scattered light cannot be provided. According to the invention, the direction of polarization is rotated by the polarized light rotating means and the edge on the medium is irradiated with the near-field light having the linearly polarized light orthogonal to the edge. For example, when an edge in one direction is irradiated with the near-field light of the linearly polarized light orthogonally thereto, strong scattering is effected by the edge and the output signal is intensified.

Next, when the direction of polarization of the near-field light is rotated and an edge in other direction is irradiated with near-field light orthogonally thereto, strong scattering is effected by the edge and the intensity of the output signal is changed. In this way, with regard to the medium formed with the marks of edges or the like in different directions, when the marks are separately detected to thereby provide multiple value data, the directions of polarization of the near-field light must be different from each other. According to the information reproducing apparatus having the above-described constitution, the direction of polarization of the near-field light can be made different. Only one of optical system can be constituted by using the polarized light rotating means and therefore, apparatus constitution is simplified.

Further, according to another embodiment, there is provided a record medium comprising a data mark of an edge formed in one direction or the like and a data mark of an edge formed in a direction different from the direction or the like on a track.

When an edge formed in a direction orthogonal to linearly polarized light is irradiated with near-field light having the linearly polarized light, strong scattered light can be provided. Conversely, even when the edge is formed in a direction the same as that of the linearly polarized light, strong scattered light cannot be provided by the edge. Therefore, when directions of forming edges are changed and the edges are irradiated with near-field light having different directions of polarization, the respective edges can be separately detected. When marks of edges or the like having different directions can separately be detected, marks having different forming directions may be formed on the same track, further, at the same position. Therefore, by such a constitution, multiple value formation is made possible and the recording density can be promoted.

Further, according to another embodiment, there is provided a record medium forming phase change layers in a longitudinal direction a state of each of which is changed by local heating in a plurality of directions on a track.

The state of the phase change layer is changed by irradiating the near-field light. For example, when the phase change layer is irradiated with near-field light having linearly polarized light in the scanning direction, the state of the phase change layer is changed in a direction orthogonal to the linearly polarized light. Similarly, when the phase change layer is irradiated with near-field light having linearly polarized light in a direction orthogonal to the scanning direction, the state of the phase change layer is changed in a direction orthogonal to the linearly polarized light. In this way, according to such a constitution, the state can be changed in different directions on the same track on the medium, further, at the same position and accordingly, multiple value formation of data is made feasible. The phase change layer is formed in accordance with a necessary number of bits.

Further, according to another embodiment, there is provided an information reproducing method irradiating a mark of an edge in a linear shape having a predetermined angle relative to a scanning direction or the like with near-field light of linearly polarized light substantially orthogonal to the mark and acquiring scattered light scattered by the mark as an output signal to thereby reproduce information.

Comparing the case in which near-field light having linearly polarized light irradiates an edge formed in a direction in parallel with the linearly polarized light with the case in which the near-field light irradiates an edge formed in a direction orthogonal to the linearly polarized light, the latter can provide strong scattered light. The invention reproduces information by using the principle. That is, by irradiating the mark on the medium with near-field light of linearly polarized light orthogonal to the mark, strong scattered light can be provided and therefore, the scattered light is used for the output signal. According to the constitution, only a mark in a direction orthogonal to the linearly polarized light in a specific direction generates strong scattered light and accordingly, even when a plurality of marks having different directions are formed at the same position, the respective marks can separately be detected. Therefore, a single pit can be loaded with multiple value data and accordingly, the recording density is promoted.

Further, according to another embodiment, there is provided an information reproducing method forming a plurality of marks of edges in a linear shape in different directions or the like on a medium, scanning the medium while irradiating the marks with near-field light of linearly polarized light, constituting scattered light scattered by the marks as output signals and acquiring multiple value data from intensities of the output signals to thereby reproduce information.

In the case in which the mark is irradiated with the near-field light of the linearly polarized light, when the mark is orthogonal to a direction of polarization of the near-field light, the near-field light is scattered and the output signal is intensified. Conversely, when the mark is in a direction different from the direction orthogonal to the direction of polarization of the near-field light, the output signal stays to be low. That is, when near-field light having one direction of polarization is irradiated, only a specific mark (in direction orthogonal to direction of polarization) can be detected. Therefore, also when a plurality of marks in a linear shape are formed by changing directions thereof at the same portion on the medium, by irradiating near-field light having linearly polarized light orthogonal to the respective marks, respective output signals can be provided from the respective marks. Therefore, even when the marks are formed at the same position, the marks can be separately detected and accordingly, the recording density can be promoted by that amount.

Further, according to another embodiment, there is provided an information reproducing method forming a tracking mark of an edge in a linear shape or the like in a scanning direction on a medium, generating near-field light polarized in a direction orthogonal to the scanning direction, scanning a vicinity of the tracking mark along the tracking mark by the near-field light, acquiring an output signal from scattered light scattered by the tracking mark and executing tracking in reproduction based on an intensity of the output signal.

When the near-field light is separated from the tracking mark, scattered light by the tracking mark is reduced and accordingly, the output signal is weakened by that amount. When the near-field light approaches the tracking mark, the scattered light by the tracking mark is increased and accordingly, the output signal is intensified by that amount. In this way, control of tracking can be carried out from strong or weak of the output signal. Further, in the case in which the tracking mark is provided in a direction different from that of a data mark, the tracking mark and the data mark can be separated from each other owing to the above-described property. Therefore, the tracking mark and the data mark can be formed at the same position.

Further, according to another embodiment, there is provided an information reproducing method comprising the steps of forming a tracking mark of an edge in a linear shape or the like in a scanning direction on a medium and forming a data mark of an edge in a linear shape or the like in a direction orthogonal to the scanning direction, orthogonally scanning the data mark by near-field light polarized in the scanning direction and scanning a vicinity of the tracking mark along the tracking mark by near-field light polarized in a direction orthogonal to the scanning direction, and acquiring an output signal from scattered light scattered by the tracking mark, executing tracking based on an intensity of the output signal, acquiring an output signal from scattered light scattered by the data mark and acquiring data based on an intensity of the output, signal to thereby reproduce information.

Tracking of the invention according to this embodiment is similar to the invention according to a previously described embodiment. With regard to data access, the data mark is formed in the direction orthogonal to the scanning direction, that is, a direction different from that of the tracking mark and the data mark is scanned by near-field light of linearly polarized light orthogonal to the data mark. In this way, even when the data mark and the tracking mark are formed on the same track, or even when a single pit is formed by the tracking mark and the data mark, the two marks can separately be detected. As a result, an area of the tracking mark (or the data mark) can be reduced and accordingly, the recording density can be promoted.

Further, according to another embodiment, there is provided an information reproducing method comprising the steps of forming data marks of edges or the like in a scanning direction and/or a direction orthogonal to the scanning direction based on recorded information and generating near-field light polarized in the scanning direction and the direction orthogonal to the scanning direction, and scattering the near-field light polarized in the scanning direction by the data mark formed in the direction orthogonal to the scanning direction, acquiring first data based on an intensity of light scattered thereby, similarly, scattering the near-field light polarized in the direction orthogonal to the scanning direction by the data mark formed in the scanning direction, acquiring second data based on an intensity of light scattered thereby and acquiring multiple value data from the first data and the second data to thereby reproduce information.

In this way, when the data marks formed in the different directions are irradiated with near-field light having linearly polarized light in directions orthogonal to the respective data marks, the respective data marks can separately be detected by the above-described characteristic. Therefore, the respective data marks can be formed as a unit pit at the same position and accordingly, multiple value formation of data is made possible.

Further, according to another embodiment, there is provided an information reproducing method comprising the steps of forming a data mark of an edge or the like in a scanning direction and/or a direction orthogonal to the scanning direction based on recorded information, scanning the data mark by near-field light polarized in the scanning direction or the direction orthogonal to the scanning direction, successively rotating a direction of polarization of the near-field light and scanning the same data mark by the near-field light polarized in the direction orthogonal to the scanning direction or the scanning direction, and scattering the near-field light polarized in the scanning direction by the data mark formed in the direction orthogonal to the scanning direction, acquiring first data based on an intensity of light scattered thereby, similarly, scattering the near-field light polarized in the direction orthogonal to the scanning direction by the data mark formed in the scanning direction, acquiring second data based on an intensity of light scattered thereby and acquiring multiple value data from the first and the second data to thereby reproduce information.

According to the invention, in view of the fact that when the data marks are irradiated with near-field light of linearly polarized light orthogonal to the data marks, strong scattered light is provided, the data marks are formed in the scanning direction and/or the direction orthogonal to the scanning direction and the near-field light of the linearly polarized light is irradiated by changing the direction of polarization. First, the data mark in the scanning direction is irradiated with near-field light of linearly polarized light orthogonal to the scanning direction to thereby provide the output signal. Next, the data mark in the direction orthogonal to the scanning direction is irradiated with near-field light having linearly polarized light in the scanning direction by rotating the direction of polarization to thereby provide the output signal. In this way, the respective data marks can separately be detected and accordingly, the respective data marks can be formed as a single pit and multiple value formation of data can be carried out.

Further, according to another embodiment, there is provided an information reproducing method according to the above described information reproducing method, characterized in that either one of the first data and the second data is subjected to bit shift and the either one is added to other thereof.

According to the invention, there is carried out bit shift of the first data (for example, 2 bits) by the data mark in the scanning direction and the second data (for example, 2 bits) by the data mark in the direction orthogonal to the scanning direction. For example, by shifting the second data and adding the second data to the first data, multiple value recording of 4 bits is made possible.

Further, according to another embodiment, there is provided an information reproducing method forming data marks of edges in a linear shape having predetermined angles relative to a scanning direction or the like on a medium, irradiating the data marks with near-field light while rotating a direction of polarization of the near-field light having linearly polarized light, constituting output signals by scattered light scattered by the data marks and acquiring multiple value data from intensities of the output signals and rotational angles at which the output signals are intensified to thereby reproduce information.

When the data mark is irradiated with the near-field light while rotating the direction of polarization of the near-field light, the scattered light is increased when the direction of polarization is orthogonal to the data mark and accordingly, strong output signal is provided. That is, by determining presence or absence of the data mark at every predetermined rotational angle, multiple value data can be acquired from the rotational angles and intensities of the output signals.

Specifically, when the direction of polarization is rotated from the scanning direction by 30 degrees, strong scattering is effected by the data mark orthogonal to the direction of polarization. Therefore, at the rotational angle of 30 degrees, 2 bits of data can be provided from presence or absence of the data mark. Next, even in the case of rotating the direction of polarization from the scanning direction by 120 degrees, strong scattering is effected by the data mark orthogonal to the direction of polarization and accordingly, at the rotational angle of 120 degrees, 2 bits of data can be provided from presence or absence of the data mark. The respective data can constitute multiple value data by carrying out bit shift. In this way, the data marks can be separately detected in accordance with directions of polarization of near-field light when the directions of forming the data marks differ and accordingly, the data marks can be formed as a unit pit.

Further, according to another embodiment, there is provided an information reproducing method forming data marks of edges in a linear shape or the like on a medium at predetermined intervals based on recorded information, scanning the medium while irradiating the data marks with near-field light having linearly polarized light substantially orthogonal to the data marks and acquiring data from intervals of intensities of output signals by scattered light scattered by the data marks to thereby reproduce information.

When the data marks are irradiated with near-field light having linearly polarized light in directions orthogonal to the data marks, the near-field light is strongly scattered by the data marks and therefore, large output signals can be provided. The data marks are formed at predetermined intervals based on recorded information and accordingly, information can be acquired from intervals of intensities of the output signals. The data marks are formed in a linear shape and accordingly, the data marks can be formed on the medium by a number larger than that of conventional pits substantially in an elliptic shape.

Further, according to another embodiment, there is provided an information reproducing method providing data marks of a plurality of edges directed in different directions or the like as one unit, irradiating the one unit of the plurality of data marks with near-field light while rotating a direction of polarization of the near-field light having linearly polarized light, constituting output signals by scattered light scattered by the respective data marks and acquiring multiple value data from intensities of the output signals and rotational angles at which the output signals are intensified to thereby reproduce information.

The invention according to this embodiment is substantially similar to the invention according to Claim 28 and featured in that the data marks are provided with a plurality of the data marks directed in different directions as one unit. When there is a relative relationship between the data mark formed in one direction and near-field light of a linearly polarized light orthogonal to the data mark, an influence by the data mark formed in other direction is not effected and even in the case of the data marks formed in a plurality of directions, these can separately be detected. Finally, multiple value data is acquired from the rotational angles and intensities of the output signals. In the case of the constitution, even when data marks are formed by a single unit, the data marks can separately be detected and accordingly, multiple value formation is made possible. Further, in an actual multiple value formation stage, the multiple value formation is carried out by the above-described bit shift.

Further, according to another embodiment, there is provided an information recording method changing a direction of polarization of near-field light having linearly polarized light based on recorded information and irradiating a medium a surface of which is provided with a substance a state of which is changed by local heating with the near-field light while changing the direction of polarization to thereby record multiple value data.

When a substance a state of which is changed by local heating, for example, a phase change film or the like is irradiated with near-field light having linearly polarized light, the state of the phase change film is changed in the direction orthogonal to the linearly polarized light. Therefore, when the direction of the linearly polarized light differs, the direction of change of the state also differs and accordingly, the state can be changed in different directions at the same position. In this way, by changing the direction of the linearly polarized light, multiple value data can be recorded at the same position.

Further, according to another embodiment, there is provided an information recording method recording first data by irradiating a medium a surface of which is provided with a substance a state of which is changed by local heating with near-field light polarized in a scanning direction and changing the state in a direction orthogonal to the scanning direction, similarly, recording second data by irradiating the medium with near-field light polarized in a direction orthogonal to the scanning direction and changing the state in the scanning direction and recording information by multiple value data.

Similar to the above-described, when the medium is irradiated with near-field light polarized in the scanning direction, the state of the medium is changed in the direction orthogonal to the direction of polarization. Similarly, when the medium is irradiated with near-field light polarized in the direction orthogonal to the scanning direction, the state of the medium is changed by the scanning direction. Thereby, the first data and the second data can be formed at the same position and accordingly, multiple value formation is made possible.

Further, according to another embodiment, there is provided an information recording method recording first data by irradiating a medium a surface of which is provided with a substance a state of which is changed by local heating with near-field light polarized in a scanning direction or a direction orthogonal to the scanning direction and changing the state in the direction orthogonal to the scanning direction or the scanning direction, successively, rotating a direction of polarization of the near-field light, recording second data by irradiating the medium with the near-field light polarized in the direction orthogonal to the scanning direction or the scanning direction and changing the state in the scanning direction or the direction orthogonal to the scanning direction and recording information by multiple value data.

According to the invention, information is recorded by rotating the direction of polarization of near-field light. That is, the state of the substance of the medium is changed by the direction orthogonal to the direction of polarization of the near-field light. Hence, the medium is irradiated with the near-field light polarized in the scanning direction to thereby change the state in the direction orthogonally thereto, successively, the direction of polarization is rotated and the medium is irradiated with near-field light having linearly polarized light in a direction orthogonal to the scanning direction to thereby change the state in a direction orthogonally thereto (the medium may be irradiated with near-field light polarized in the direction orthogonal to the scanning direction to thereby change the state in the scanning direction and successively the medium may be irradiated with near-field light having linearly polarized light in the scanning direction to thereby change the state in the direction orthogonal thereto by rotating the direction of polarization). In this way, the first data and the second data can be recorded at the same position and accordingly, multiple value formation is made possible.

Further, according to another embodiment, there is provided an information recording method irradiating a medium a surface of which is provided with a substance a state of which is changed by local heating with near-field light having linearly polarized light while rotating a direction of polarization thereof, controlling the irradiation based on recorded information by a unit of a predetermined rotational angle and changing the state in a direction orthogonal to a direction of polarization of the near-field light by the unit of the rotational angle to thereby record information by multiple value data.

The direction of changing the state of the medium differs by the direction of polarization of the near-field light and accordingly, by controlling to rotate the direction of polarization and irradiating the near-field light, a plurality of data can be recorded at the same position. For example, when the data is recorded by a unit of 30 degrees, data of 2 bits can be recorded in 6 directions and accordingly, a total of 12 bits of data can be recorded.

Further, according to another embodiment, there is provided an information recording method according to the above described information recording method, wherein the unit of the rotational angle is made to be equal to or larger than 10°.

According to the above-described information recording method, theoretically, data can be recorded by dividing 180 degrees by a unit of 1 degree or smaller, however, actually, it is pertinent to constitute the unit of 10 degrees or larger in consideration of physical properties of the medium and resolution or the like since the state on the medium is changed.

BRIEF DESCRIPTION OF THE DRAWINGS

FIGS. 1A-1C are explanatory views showing a polarized state of near-field light.

FIG. 2 is a perspective view showing a sample.

FIGS. 3A-3C are explanatory views showing marks formed on samples.

FIG. 10 is an outline constitution view showing an information reproducing apparatus according to Embodiment 3 of the invention.

FIG. 11 is a block diagram showing a constitution of a control circuit.

FIG. 12 is an upper view showing a memory medium and a head.

FIGS. 13A-13B are graph diagrams showing an output intensity of a light receiving element.

FIGS. 18A-18C are explanatory views showing an information reproducing apparatus according to Embodiment 7 of the invention.

FIGS. 20A, 20B-1, 20B-2 and 20C are explanatory views showing an information recording principle in the information recording apparatus shown in FIG. 19.

FIG. 21 is an outline constitution view showing an information recording apparatus according to Embodiment 10 of the invention.

FIG. 22 is an explanatory view showing information recording principle in the information recording apparatus shown in FIG. 21.

FIG. 23 is an explanatory view showing recording principle of an information recording apparatus according to Embodiment 11 of the invention.

DETAILED DESCRIPTION OF THE PREFERRED EMBODIMENTS

Figure 4:
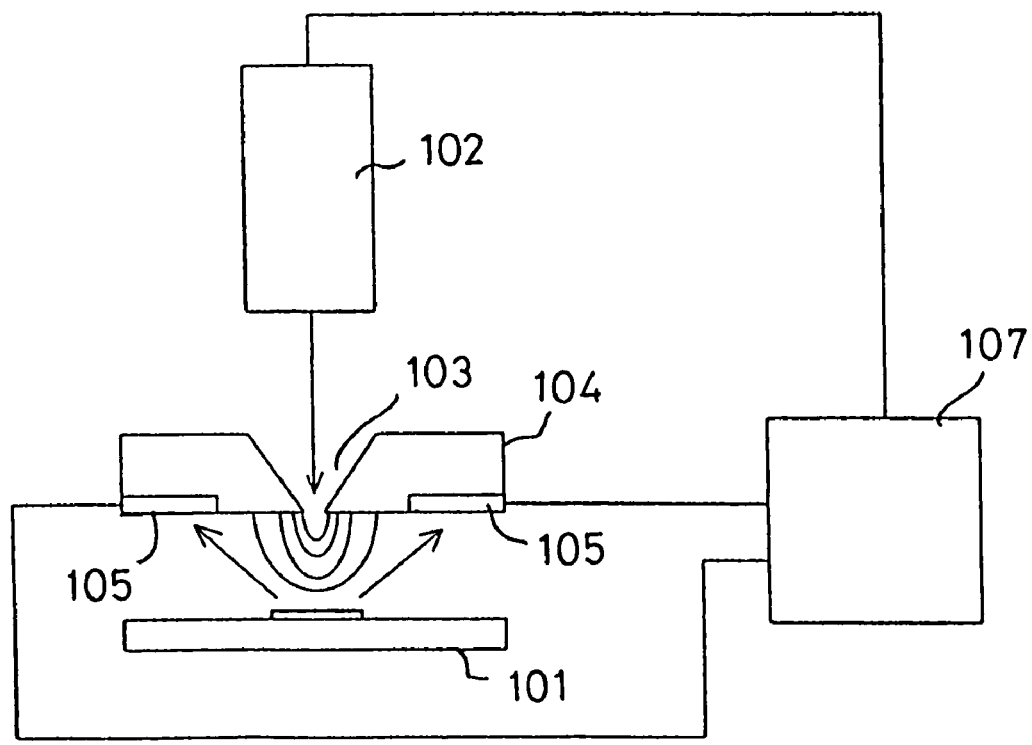
FIG. 4 is an outline constitution view showing an information reproducing apparatus according to Embodiment 1 of the invention.

A detailed explanation will be given of the invention with reference to the drawings as follows.

Further, the invention is not limited by the embodiments described herein.

Embodiment 1

The principle of information reproducing/recording utilizes a physical phenomenon known in the field of a near field microscope. It is known that an image provided in the case in which near-field light is linearly polarized light, differs by a difference in a relative positional relationship between a direction of polarization and a surface shape of a sample.

First, an explanation will be given of polarization of near-field light. As shown by FIG. 1, near-field light is generated by making laser light from a laser oscillator 1 enter a very small aperture 3 of a head 4. The very small aperture 3 functions as a quarter wavelength plate with regard to input light. As shown by FIG. 2, a sample 5 is produced by patterning an edge 7 (A1) in a rod-like shape on a glass substrate 6. Laser light R of linearly polarized light (as shown in FIG. 1A) is converted from the linearly polarized light to circularly polarized light by passing through a quarter wavelength plate 2 (as shown in FIG. 1B). Next, when the laser light R of circularly polarized light is introduced into the very small aperture 3, near-field light N of linearly polarized light is provided (as shown in FIG. 1C). In the case in which a direction of separating from the very small aperture 3 is defined as Z axis, although the near-field light N does not oscillate but attenuates in Z direction, in XY face orthogonal thereto, an electric field is oscillated. Therefore, the polarization can be defined by the phase. That is, every time of shifting the phase by ¼ (90 degrees), the linearly polarized light and circularly polarized light change alternately. When a flat plate glass is made access to the very small aperture 3 and scattered light is observed, such a polarized state can be observed.

Further, in order to make the direction of polarization of the near-field light N and the direction of polarization of the laser light R coincide with each other, a half wavelength plate may further be installed on the optical axis (not illustrated). The reason is that the quarter wavelength plate 2 is used and the very small aperture 3 functions as a quarter wavelength plate and accordingly, when the half wavelength plate is installed, the phase is shifted exactly by an amount of one wavelength.

Back to FIG. 1, Betzig et al have discovered that as a result of observing the sample 5 by a transmission type near field microscope, an output therefrom is increased when the edge 7 is made orthogonal to the direction of polarization of the near field light N and the output is reduced when the edge 7 is made in parallel therewith (Betzig, E., Trautman, J. K., Weiner, J. S., Harris, T. D., and Wolfe, R., Applied Optics, 31 (1992) 4563). Further, it has been reported that there is a correlation between polarization of the near-field light N and an output intensity even in the case in which a sample (not illustrated) formed with a groove on an Si substrate coated with Au is observed by a reflection type near field microscope (Paesler, M. A and Moyer P. J, Near Field Optics, Wiley Interscience, 1996).

Further, it has been predicted from a two-dimensional simulation by Novotny et al that not only the output intensity but also a magnitude of influence effected on an output image by a scattering member on the surface of the sample 5, differ by the direction of polarization of the near-field light N (Novotny, L., Pohl, D. W., and Regli, P., Ultramicroscopy 57 (1995) 180).

As described above, the output of the scattered light differs by a directional relationship between a direction of forming the edge 7 and the direction of polarization of the near-field light N and accordingly, when the effect is utilized, high density formation of the reproducing/recording apparatus can be carried out. Further, single polarized light can be used in tracking. An explanation will be given by showing examples in FIG. 3. As shown by (a) of the drawing, the sample 5 formed with horizontal, vertical, cross and square marks 8 on its surface is observed by using the near-field light N having different directions of polarization. As shown by (b) of the drawing, when a very small aperture 3a for generating linearly polarized light in the left and right direction is used for a probe, only vertical direction portions 8a of the marks 8 on the sample 5 are observed. Meanwhile, as shown by (c) of the drawing, when a very small aperture 3b for generating linearly polarized light in the up and down direction is used for the probe, only horizontal direction portions 8b of the marks 8 on the sample 5 are observed.

As shown by (c) and (d) of FIG. 3, a point to be noted resides in that when marks 8' having vertical direction and horizontal direction components at the same positions are formed, there are provided images which differ depending on directions of polarization. That is, information of 4 bits can be acquired from the single mark 8' having the vertical and horizontal direction components. In comparison therewith, according to the conventional system, only information of 2 bits can be acquired from a single mark. Therefore, by applying the above-described principle to an information reproducing/recording apparatus, the recording density can be redoubled.

FIG. 4 shows a specific example of such an information reproducing apparatus. The information reproducing apparatus 100 is constituted by an information recording medium 101 formed with a mark having vertical and horizontal direction components, a light source 102 for generating two kinds of light having different directions of polarization, a head 104 having a very small aperture 103, a light receiving means 105 for acquiring scattered light by the mark for respective directions of polarization and signal processing means 107 for processing a signal from the light receiving means 105. Further, information can be recorded also by changing the direction of polarization. Next, an explanation will be given of a further detailed specific example in Embodiment 2 as follows.

Embodiment 2

Figure 5:
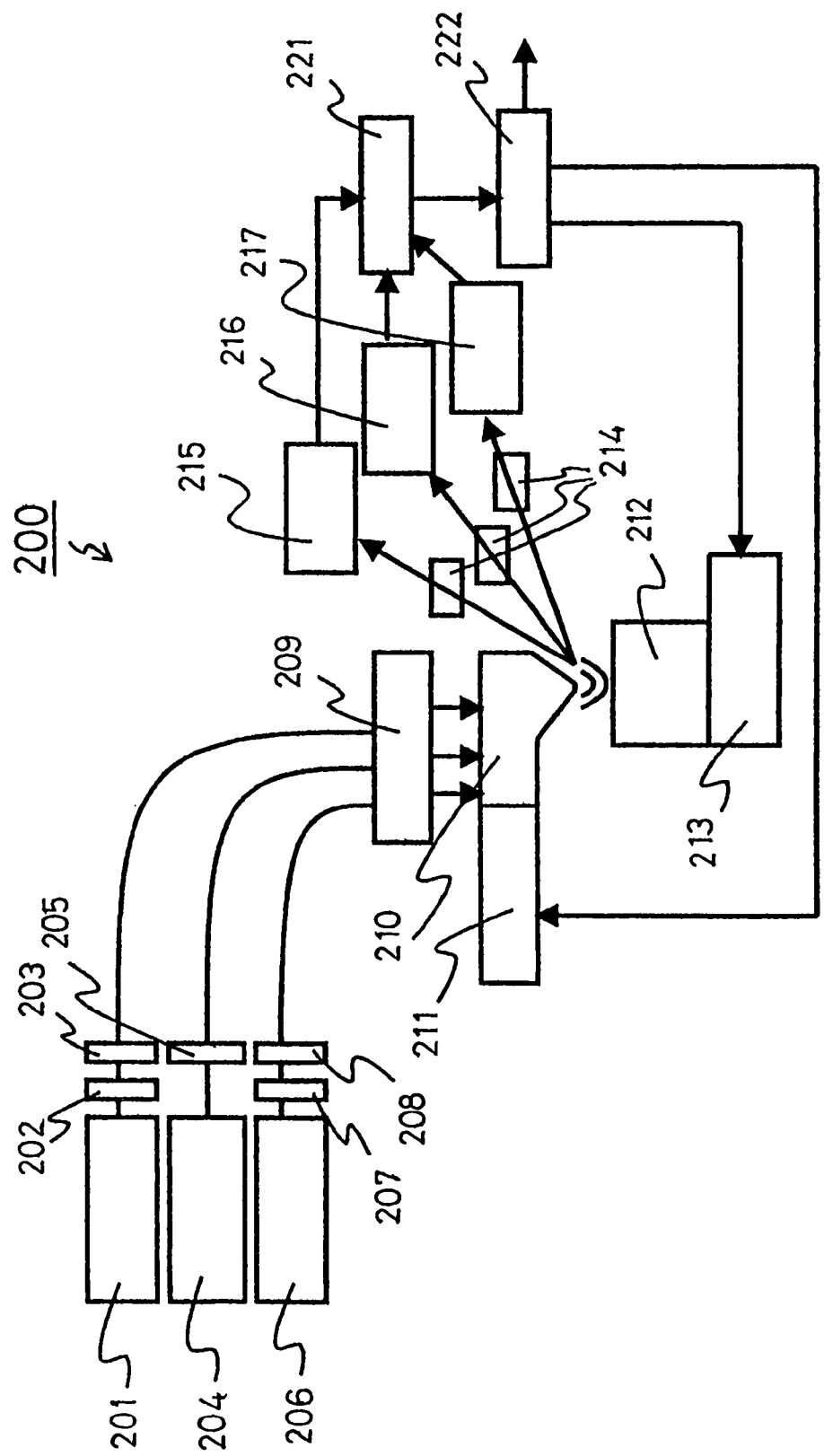
FIG. 5 is an outline constitution view showing an information reproducing apparatus according to Embodiment 2 of the invention.
Figure 6:
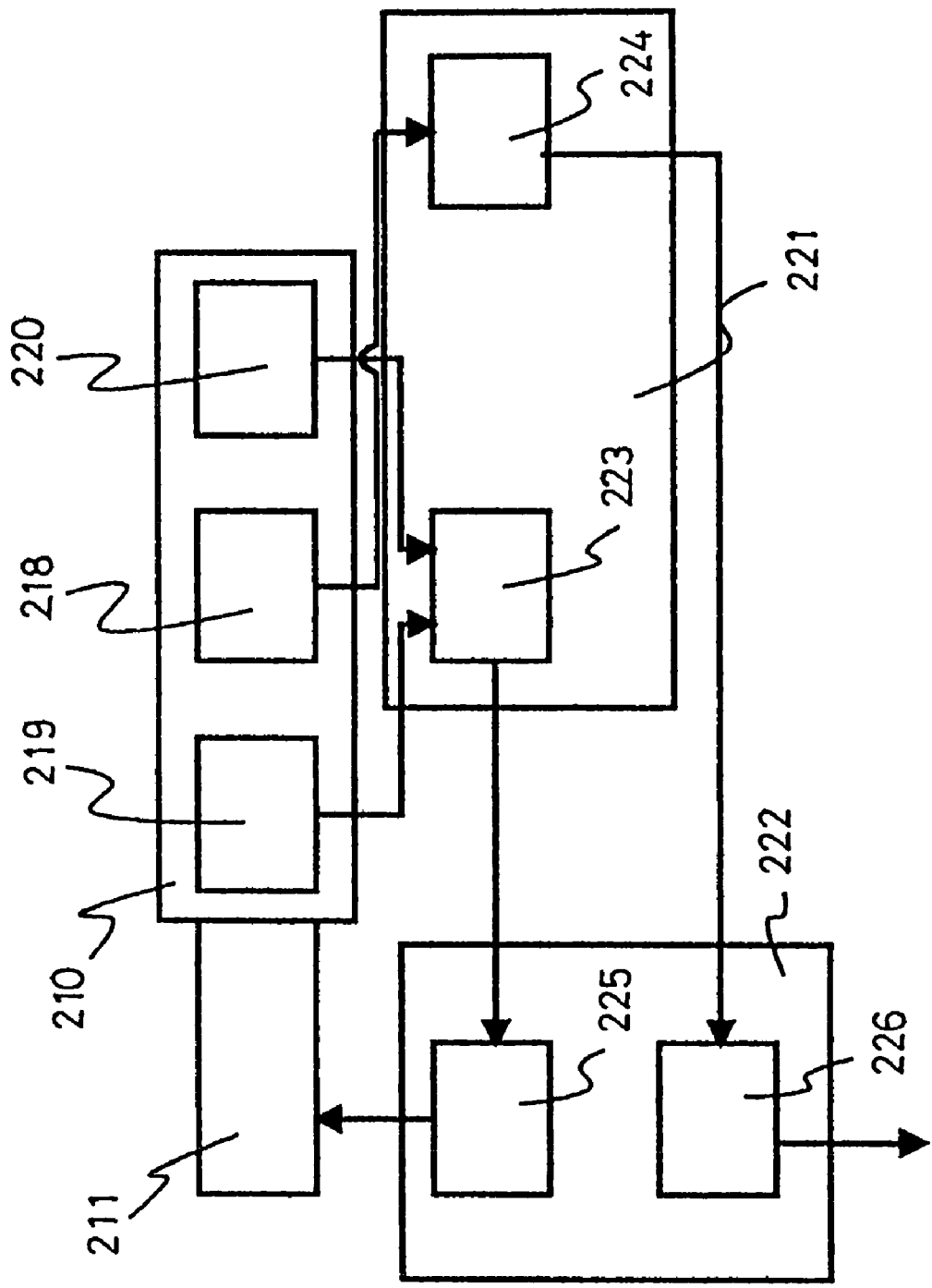
FIG. 6 is a detailed constitution view showing a portion of the information reproducing apparatus shown in FIG. 5.

FIG. 5 is an outline constitution view showing an information reproducing apparatus according to Embodiment 2 of the invention. FIG. 6 is a detailed constitution view showing a portion of the information reproducing apparatus shown in FIG. 5. The information reproducing apparatus 200 is provided with a wavelength $\lambda 1$ laser oscillator 201 for outputting laser light having a wavelength $\lambda$ used in tracking, a half wavelength plate 202 and a quarter wavelength plate 203 arranged on a laser light axis of the wavelength $\lambda 1$ for converting the direction of polarization of the laser light, a wavelength $\lambda 2$ laser oscillator 204 for outputting laser light having a wavelength $\lambda 2$ used in data access, a quarter wavelength plate 205 arranged on a laser optical axis of the wavelength $\lambda 2$ for converting the direction of polarization of the laser light, a wavelength $\lambda 3$ laser oscillator 206 for outputting laser light having a wavelength $\lambda 3$ used for tracking, a half wavelength plate 207 and a quarter wavelength plate 208 arranged on a laser optical axis of the wavelength $\lambda 3$ for converting the direction of polarization of the laser light.

Further, the information reproducing apparatus 200 is provided with a wave guide 209 for transmitting laser light of the respective wavelengths, a head 210 installed to connect to the wave guide 209, a head driving actuator 211 for driving the head 210, a memory medium driving actuator 213 for driving a memory medium 212 (a description will be given later of the memory medium), condensing lenses 214 for condensing scattered light scattered on the surface of the memory medium according to respective wavelengths, a light receiving element 215 for the wavelength $\lambda 1$ for receiving scattered light having the wavelength $\lambda 1$, a light receiving element 216 for the wavelength $\lambda 2$ for receiving scattered light having the wavelength $\lambda 2$ and a light receiving element 217 for the wavelength $\lambda 3$ for receiving scattered light having the wavelength $\lambda 3$. The head 210 is provided with a very small aperture 218 for data access for generating near-field light and having a function of a quarter wavelength plate and provided with very small apertures 219 and 220 similarly having a function of a quarter wavelength plate on both sides thereof.

Next, there are provided an output signal processing circuit 221 and a control circuit 222 as means for processing signals acquired by the light receiving elements 215 through 217. The output signal processing circuit 221 is provided with a difference circuit 223 for calculating a difference of signals for tracking (by the light receiving element 215 for the wavelength $\lambda 1$ and the light receiving element 217 for the wavelength $\lambda 3$) and a read data signal processing circuit 224 for processing a signal for data access (the light receiving element 216 for the wavelength $\lambda 2$). Further, the control circuit 222 is provided with a head drive circuit 225 for carrying out access/tracking control of the head 210 and a read data output control circuit 226 for outputting read data.

Figure 7:
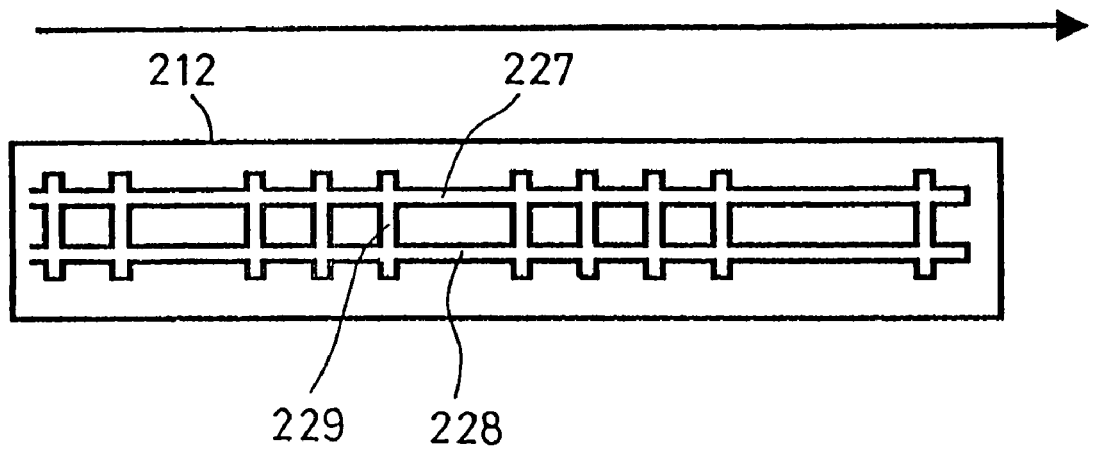
FIG. 7 is an upper view showing a memory medium shown in FIG. 5.

FIG. 7 is an upper view showing the memory medium 212. There are formed two of tracking marks 227 and 228 having a longitudinal shape in the tracking direction on a base plate of the memory medium 212. Further, there are arranged data marks 229 as in cross ties of a railroad relative to the tracking marks 227 and 228. Sizes of the data mark 229 and the tracking marks 227 and 228 may be made equal to or smaller than a wavelength of light for using near-field light. As a material of the base plate, for example, silicon or glass is used. Further, the data mark 229 and the tracking marks 227 and 228 are formed by a metal such as A or a polymer film (Polymethylmethacrylate; PMMA) and edges are formed by mark edge portions of these.

Figure 26:
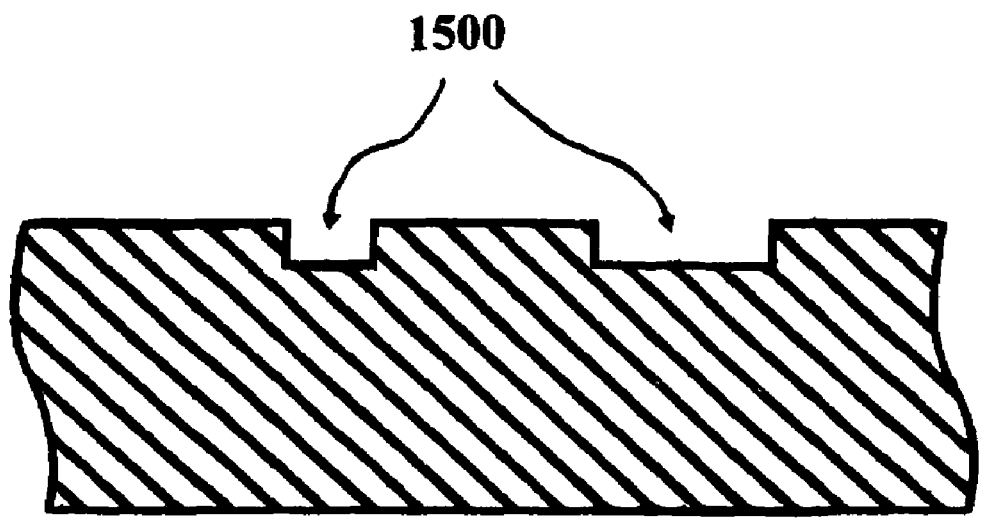
FIG. 26 is a cross-sectional view of the sample having linear marks in the form of grooves.
Figure 27:
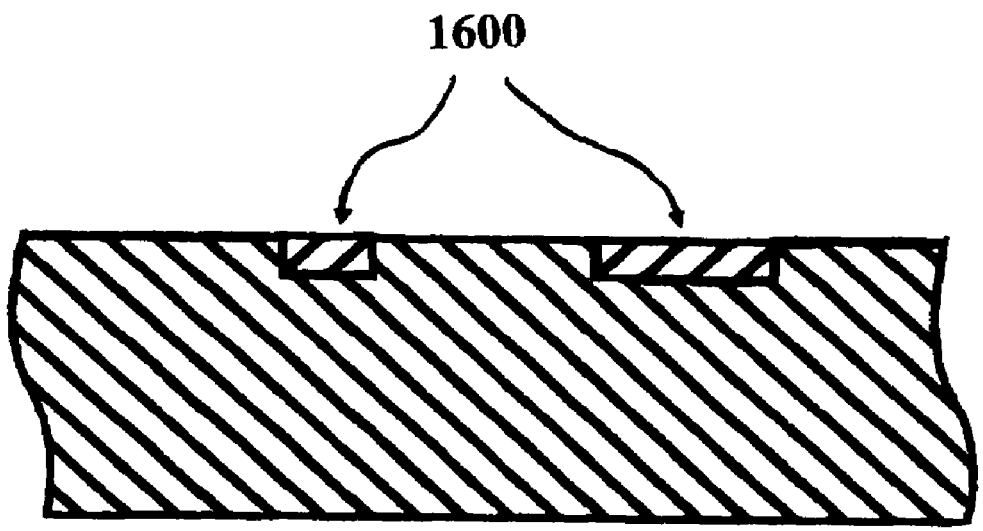
FIG. 27 is a cross-sectional view of the sample having linear marks in the form of substances having different optical properties.

Further, the data mark 229 and the tracking marks 227 and 228 may be formed by projections 7 (FIG. 2) or grooves 1500 (FIG. 26) or may be formed by arranging substances 1600 (FIG. 27) having different optical properties such as refractive indices on a flat surface. Further, the tracking marks 227 and 228 and the data mark 229 may not be formed to overlap each other as in the drawing but may be arranged to be separate from each other.

Figure 8:
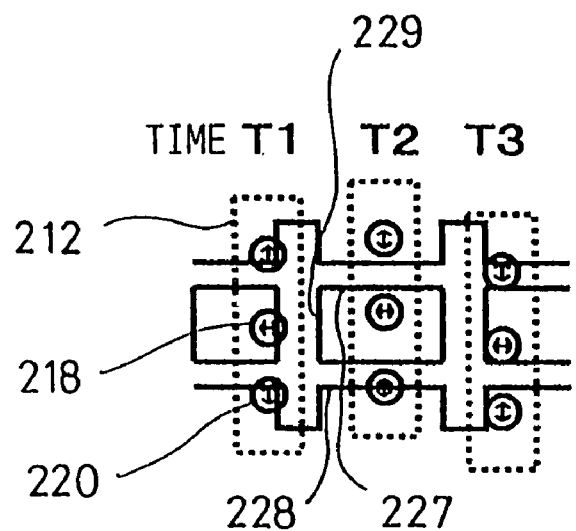
FIG. 8 is an explanatory view showing a tracking/reproducing method by the information reproducing apparatus shown in FIG. 5.
Figures 9A, 9B, 9C:
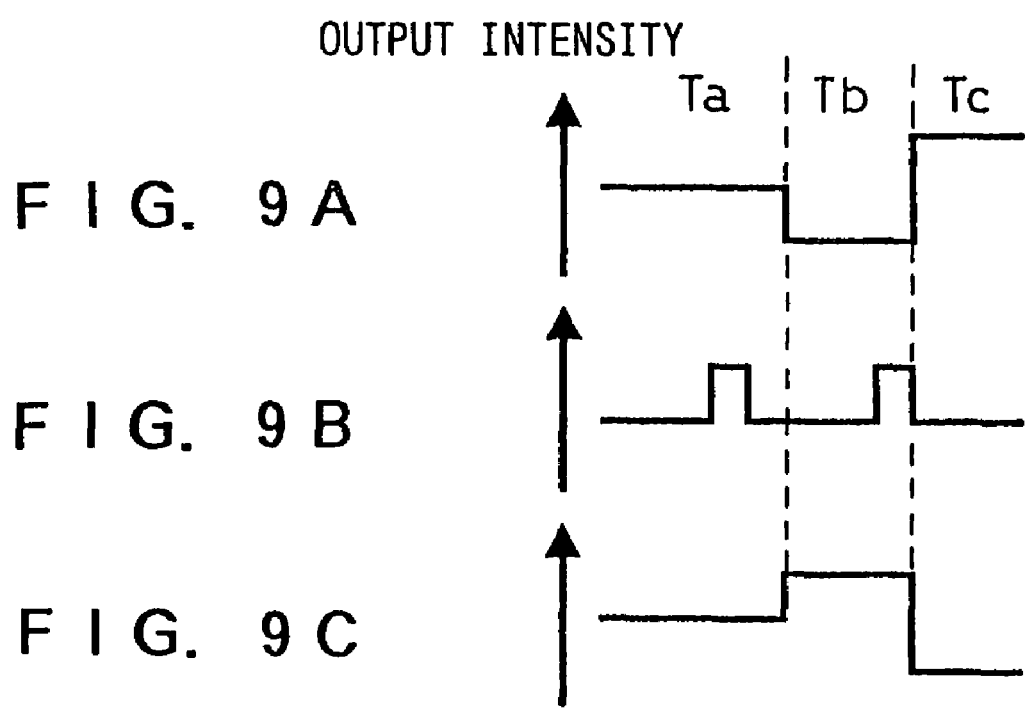
FIGS. 9A-9C are explanatory views showing states of an output signal of the information reproducing apparatus shown in FIG. 5.

Next, an explanation will be given of operation of the information reproducing apparatus 200. FIG. 8 is an explanatory view showing a tracking/reproducing method of the information reproducing apparatus 200. FIG. 9 is an explanatory view showing states of an output signal. A positional relationship among the data mark 229 and the tracking marks 227 and 228, the very small aperture 218 for data access and the very small apertures 219 and 220 for tracking, is as shown by the drawing. The respective very small aperture 219 and 220 for tracking are disposed on skewed upper sides of the tracking marks 227 and 228. The very small aperture 218 for data access is disposed to be able to pass on the data mark 229 between the tracking marks 227 and 228.

First, an explanation will be given of tracking of the head 210. The phase of laser light outputted from the l1 wavelength laser oscillator 201 is shifted by three quarter wavelength by the half wavelength plate 202 and the quarter wavelength plate 203 to thereby convert original linearly polarized light into circularly polarized light. The laser light R1 is introduced into the very small aperture 219 for tracking. The very small aperture 219 for tracking is provided with a function of a quarter wavelength plate and accordingly, the phase of the near-field light provided by the very small aperture 219 for tracking is shifted by one wavelength compared with that of the laser light R1 and the circularly polarized light is converted again to linearly polarized light. Successively, the near-field light is scattered by the tracking mark 227 on the memory medium 212. The scattered light is condensed by the condensing lens 214 and is received by the light receiving element 215 for the wavelength $\lambda 1$. Photoelectric conversion is carried out in the light receiving element 215 for the wavelength $\lambda 1$ and an output signal therefrom is transmitted to the output signal processing circuit 221.

Similarly, laser light R3 outputted from the l3 wavelength laser oscillator 206 becomes near-field light the phase of which is shifted by one wavelength by passing through the half wavelength plate 207, the quarter wavelength plate 208 and the very small aperture 220 for tracking. The near-field light is scattered by the tracking mark 228 on the memory medium 212 and the scattered light is condensed by the condensing lens 214 and is received by the light receiving element 217 for the wavelength $\lambda 3$. Photoelectric conversion is carried out in the light receiving element 217 for the wavelength $\lambda 3$ and an output signal therefrom is transmitted to the output signal processing circuit 221.

In the output signal processing circuit 221, there is calculated a difference between the output signal of the l1 wavelength system and the output signal of the l1 wavelength system by the differencer 223. The difference is transmitted to the head driving circuit 225 and constitutes a control amount of the head drive actuator 211. Explaining the operation in reference to the drawings, as shown by T1 in the drawing, the very small-apertures 219 and 220 for tracking are disposed on skewed upper sides of the tracking marks 227 and 228 at correct tracking positions. In this case, as shown by an interval Ta of (a) and (c) of FIG. 9, the output signals indicate predetermined values.

However, when the head 210 is shifted, as shown by T2 in the drawing, the very small aperture 219 for tracking of the l1 wavelength is separated from the tracking mark 227 and the very small aperture 220 for tracking of the l2 wavelength moves to an upper side of the tracking mark 228. Therefore, as shown by an interval Tb of (a) and (c) of FIG. 9, the output intensity of the I1 wavelength system is reduced and the output intensity of the I1 wavelength system is increased.

Conversely, as shown by T3 in the drawing, when the very small aperture 219 for tracking of the I1 wavelength is disposed above the tracking mark 227 and the very small aperture 220 for tracking of the I2 wavelength is separated from the tacking mark 228, the output intensity of the I1 wavelength system is increased and the output intensity of the I3 wavelength system is reduced (interval Tc of (a) and (c) of FIG. 9).

When the head 210 is shifted, there is produced a difference between the output intensity of the I1 wavelength system and the output intensity of the I3 wavelength system and therefore, an output from the differencer 223 is increased. The head drive circuit 225 carries out tracking of the head 210 in accordance with the output from the differencer 223. For example, when the output intensity of the I1 wavelength system is reduced and the output intensity of the I3 wavelength system is increased, it is determined that the head 210 is shifted in an upper direction of the drawing and the head 210 is controlled to move in a direction reverse thereto. Similarly, when the output intensity of the I1 wavelength system is increased and the output intensity of the I3 wavelength system is reduced, it is determined that the head 210 is shifted in a lower direction of the drawing and the head 210 is controlled to move in a direction reverse thereto.

Next, an explanation will be given of data access of the head 210. The phase of laser light R2 outputted from the I2 wavelength laser oscillator 204, is shifted by a quarter wavelength by the quarter wavelength plate 205 to thereby convert original linearly polarized light into circularly polarized light. The laser light R2 is introduced to the very small aperture 218 for data access. The very small aperture 218 for data access is provided with a function of a quarter wavelength plate and accordingly, the phase of near-field light provided by the very small aperture 218 for data access is shifted by a half wavelength relative to that of the original laser light R2 to thereby convert the circularly polarized light again into linearly polarized light. Successively, the near-field light is scattered by the data mark 229 on the memory medium 212. The scattered light is condensed by the condensing lens 214 and is received by the light receiving element 216 for the wavelength λ2. Photoelectric conversion is carried out in the light receiving element 216 for the wavelength λ2 and an output signal therefrom is transmitted to the output signal processing circuit 221.

Explaining thereof in reference to the drawings, as shown by (b) of FIG. 9, a direction of polarization of the near-field light generated from the very small aperture 218 for data access is the same as the tracking direction and therefore, when the very small aperture 218 for data access is disposed above data mark 229, the output signal is intensified.

Data acquired in this way is subjected to processings of A/D conversion, decoding, error detection, correction, D/A conversion and the like by the read data signal processing circuit 224 of the output signal processing circuit 221 and is converted into a signal suitable for information reproduction.

Further, the data is transmitted to the read data output control circuit 226 and is outputted to an amplifier (not illustrated) as read data.

As described above, according to the information reproducing apparatus 200 of the invention, the data mark 229 and the tracking marks 227 and 228 can be arranged to overlap each other and therefore, the track width can be narrowed by that amount. Accordingly, the recording density can outstandingly be promoted.

Embodiment 3

FIG. 10 is an outline constitution view showing an information reproducing apparatus according to Embodiment 3 of the invention. The information reproducing apparatus 300 is featured in that a unit pit is provided with information of 4 bits and is provided with a wavelength λ1 laser oscillator 301 for outputting laser beam having a wavelength λ1 used for data access, a half wavelength plate 302 and a quarter wavelength plate 303 arranged on an optical axis of the laser of the wavelength λ1 for converting a direction of polarization of the laser light and a wavelength λ2 laser oscillator 304 for outputting laser light having a wavelength λ2 used for data access and a quarter wavelength plate 305 arranged on an optical axis of the laser of the wavelength λ2 for converting a direction of polarization of the laser light.

Further, the information reproducing apparatus 300 is provided with a wave guide 306 for transmitting the laser light of the respective wavelengths, a head 307 installed to connect to the wavelength 306, a head drive actuator 308 for driving the head 307, a memory medium drive actuator 310 for driving a memory medium 309 (a description will be given later of the memory medium), condensing lenses 311 for condensing scattered light scattered at the surface of the memory medium 309 for respective wavelengths, a light receiving element 312 for the wavelength λ1 for receiving scattered light of the wavelength λ1 and a light receiving element 313 for the wavelength λ2 for receiving the scattered light of the wavelength λ2. The head 307 is sequentially installed with two of a very small aperture 314 for first data access and a very small aperture 315 for second data access each for generating near-field light and having a function of a quarter wavelength plate.

Further, there are provided an output signal processing circuit 316 and a control circuit 317 as means for processing signals acquired from the light receiving elements 312 and 313. The output signal processing circuit 316 is provided with a read data signal processing circuit for processing a signal for data access (not illustrated). As shown by FIG. 11, the control circuit 317 is provided with a bit shift calculator 318 for subjecting an output signal from the very small aperture 315 for data access on one side to bit shift and an adder 319 for adding a signal subjected to bit shift to an output signal from the very small aperture 314 for data access on the other side. Further, there are provided a head drive circuit for carrying out access/tracking control of the head 307 and a read data output control circuit for outputting read data (not illustrated). Further, pits for tracking are provided separately (not illustrated).

FIG. 12 is an upper view showing the memory medium 309 and the head 307. On a base plate of the memory medium 309, there are formed a data mark 320 in the vertical direction, a data mark 321 in the horizontal direction and a data mark 322 in a cross shape intersected with data marks in the vertical direction and the horizontal direction in accordance with information. Sizes of the data marks 320 through 322 can be made equal to or smaller than a wavelength of light for using near-field light. As a material of the base plate, silicon, glass or the like is used similar to the above-described. Further, the data marks 320 through 322 are formed by a metal such as A or PMMA and edges are formed by mark edge portions of these. Further, the data mark 320 through 322 may be formed by projections or grooves or may be arranged with substances having different optical properties such as reflective indices or the like on a flat surface.

Further, the head 307 is formed with two of the very small apertures 314 and 315 for data access, a direction of polarization related to the very small aperture 314 for the first data access on one side is directed in the horizontal direction and a direction of polarization related to the very small aperture 315 for the second data access is directed in the vertical direction.

Next, an explanation will be given of operation of the information reproducing apparatus 300. FIG. 13 is a graph diagram showing output intensities of the light receiving elements. First, an explanation will be given of a signal processing related to the very small aperture 314 for the first data access. The phase of laser light outputted from the $\lambda 1$ wavelength laser oscillator 301 is shifted by three quarter wavelength by the half wavelength plate 302 and the quarter wavelength plate 303 to thereby convert original linearly polarized light into circularly polarized light. The laser light R1 is introduced into the very small aperture 314 for the first data access. The very small aperture 314 for the first data access is provided with a function of a quarter wavelength plate and accordingly, the phase of near-field light provided by the very small aperture 314 for the first data access is shifted by one wavelength relative to that of the original laser light R1 to thereby convert the circularly polarized light again into linearly polarized light. Successively, the near-field light is scattered by the data marks 320 through 322 on the memory medium 309. The scattered light is condensed by the condensing lens 311 and is received by the light receiving element 312 for the wavelength $\lambda 1$. Photoelectric conversion is carried out in the light receiving element 312 for the wavelength $\lambda 1$ and an output signal therefrom is transmitted to the output signal processing circuit 316.

Next, an explanation will be given of a signal processing related to the very small aperture 315 for the second data access. The phase of the laser light R2 outputted from the $\lambda 2$ wavelength laser oscillator 304 is shifted by a quarter wavelength by the quarter wavelength plate 305 to thereby convert original linearly polarized light into circularly polarized light. The laser light R2 is introduced to the very small aperture 315 for the second data access. The very small aperture 315 for the second data access is provided with a function of a quarter wavelength plate and accordingly, the phase of near-field light provided by the very small aperture 315 for the second data access is shifted by a half wavelength relative to that of the original laser light R2 to thereby convert the circularly polarized light again into linearly polarized light. Successively, the near-field light is scattered by the data mark 320 through 322 on the memory medium 309. The scattered light is condensed by the condensing lens 311 and is received by the light receiving element 313 for the wavelength $\lambda 2$. Photoelectric conversion is carried out in the light receiving element 313 for the wavelength $\lambda 2$ and an output signal therefrom is transmitted to the output signal processing circuit 316.

Explaining the above-described in reference to FIG. 12 and FIG. 13, a direction of polarization of the near-field light generated from the very small aperture 314 for the first data access is the same as the tracking direction (horizontal direction in the drawing). Therefore, when the near-field light is disposed on the data mark 320 in the vertical direction and on the data mark 322 in the cross shape including the data mark in the vertical direction, the signal intensity is intensified ((b) of FIG. 13). Meanwhile, the direction of polarization of the near-field light generated from the very small aperture 315 for the second data access is orthogonal to the tracking direction (vertical direction in the drawing). Therefore, when the near-field light is disposed on the data mark 321 in the horizontal direction and on the data mark 322 in the cross shape including the data mark in the horizontal direction, the signal intensity is intensified ((a) of FIG. 13).

As described above, according to the information reproducing apparatus 300, a unit pit (data marks 320 through 322) can be provided with information of 4 bits at maximum and accordingly, multiple value formation is feasible and the recording density can be promoted outstandingly. Further, although according to the above-described, there are used the laser oscillators 301 and 302 having different wavelengths, a single one of the laser oscillator may be provided, output light therefrom may be branched and the branched laser light on one side may be polarized by a polarizing plate.

Embodiment 4

Only one of a very small aperture for data access may be formed at the head 307 and the same data mark area may again be scanned by rotating a direction of polarization (not illustrated). For example, on a memory medium in a shape of a circular disk, the data marks according to Embodiment 3 are formed, firstly, the data marks are scanned by near-field light having a predetermined direction of polarization and the same data marks are scanned again in a state in which the direction of polarization has been rotated. In rotating the direction of polarization, there is used a high-speed rotary polarizer capable of controlling a rotational direction by applying voltage, which is made synchronous with rotation of the memory medium. In this way, multiple value formation similar to that in Embodiment 3 is feasible and the recording density can be promoted outstandingly.

Embodiment 5

Figure 14:
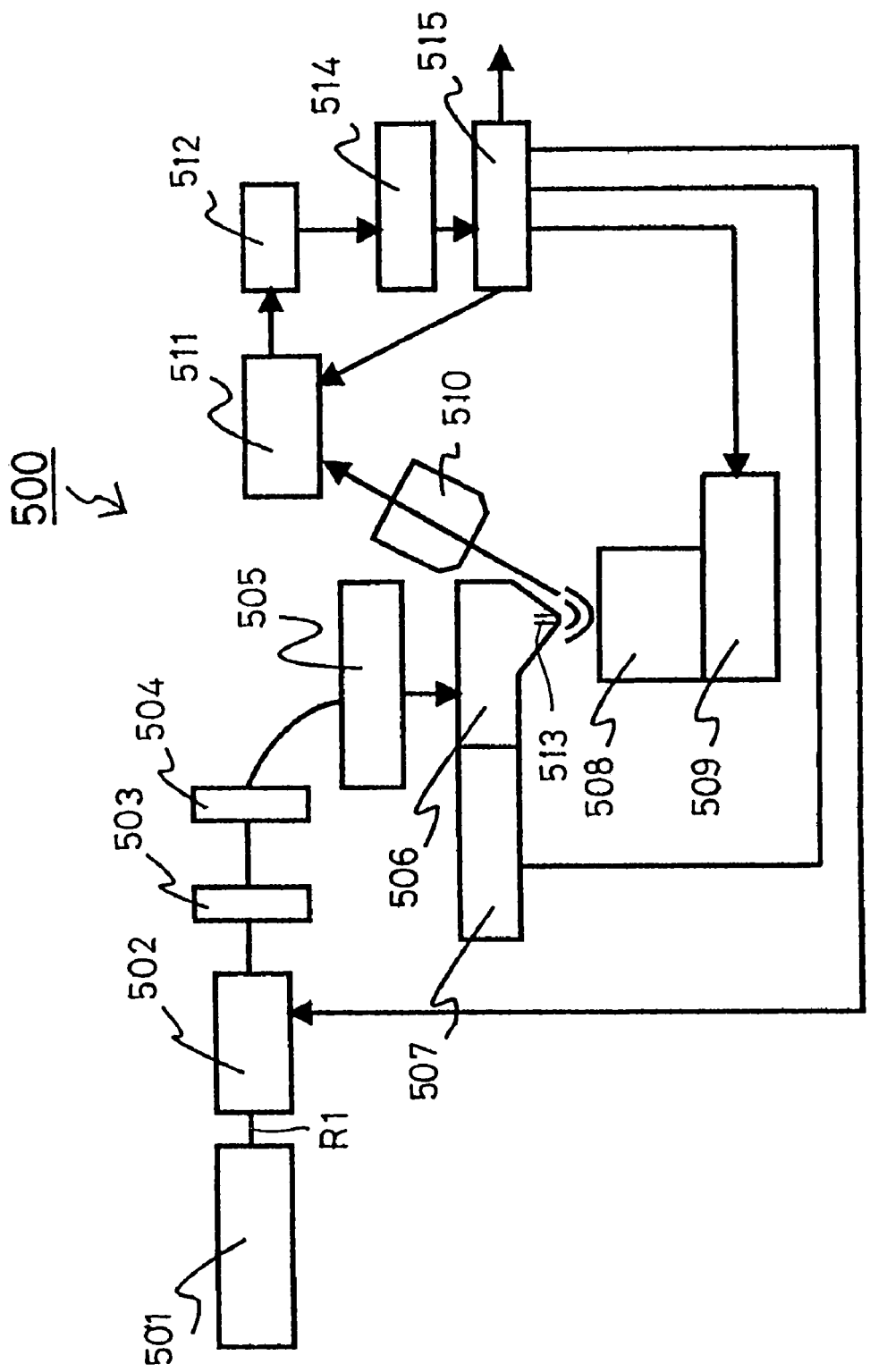
FIG. 14 is an outline constitution view showing an information reproducing apparatus according to Embodiment 5 of the invention.
Figure 15:
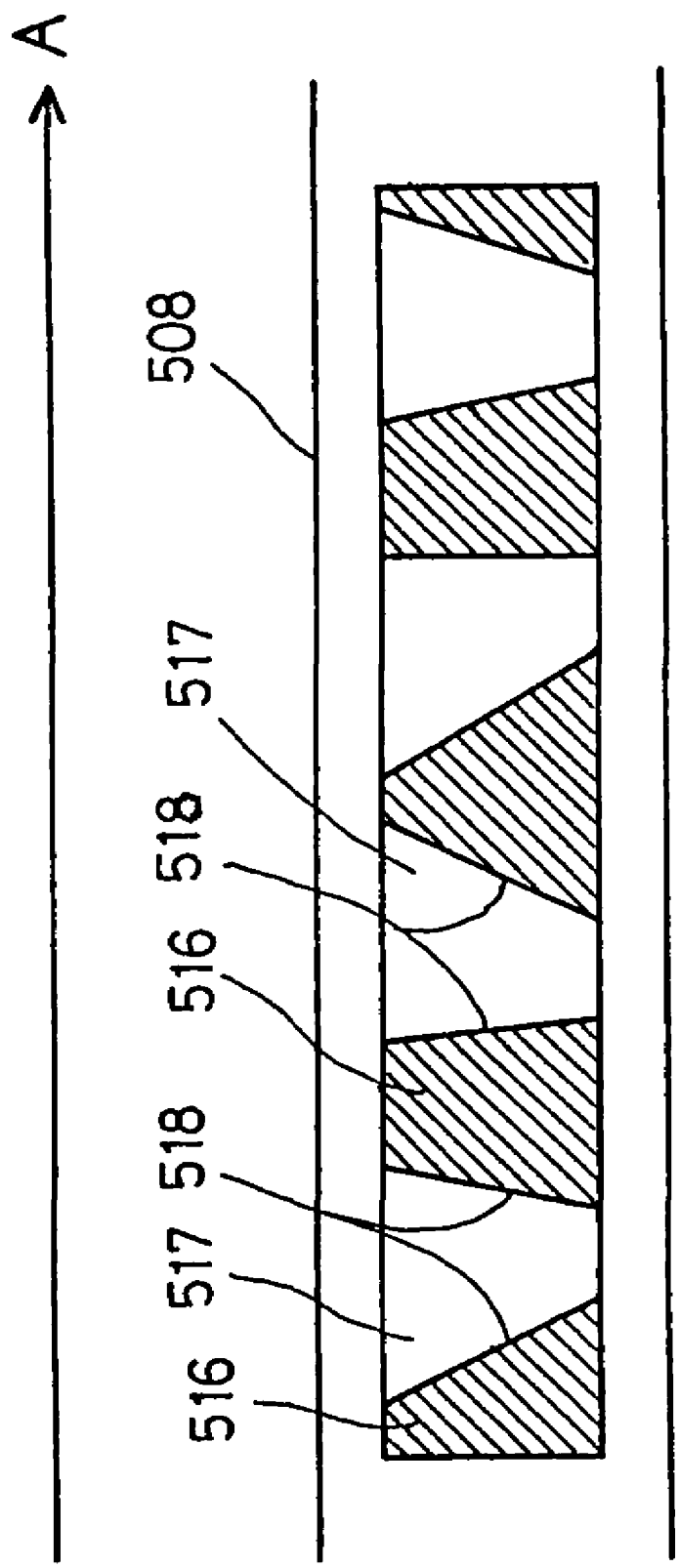
FIG. 15 is an explanatory view showing data mark modes of a memory medium used in the information reproducing apparatus.

FIG. 14 is an outline constitution view showing an information reproducing apparatus according to Embodiment 5 of the invention. FIG. 15 is an explanatory view showing data mark modes of a memory medium used in the information reproducing apparatus. The information reproducing apparatus 500 is featured in that edges having inclinations are formed on a memory medium and near-field light is irradiated while rotating a direction of polarization at high speed to thereby acquire data. The information reproducing apparatus 500 is provided with a wavelength $\lambda 1$ laser oscillator 501 for outputting laser light having a wavelength $\lambda 1$ used for data access, a high-speed rotary polarizer 502 comprising an electro-optic element of KDP (potassium phosphate) or the like for rotating a direction of polarization of laser light at high speed, a half wavelength plate 503 and a quarter wavelength plate 504 arranged on an optical axis of laser of the wavelength $\lambda 1$ for converting the direction of polarization of the laser light, a wave guide 505 for transmitting the laser light and a head 506 installed to connect to the wave guide 505.

Further, the information reproducing apparatus 500 is provided with a head drive actuator 507 for driving the head 506, a memory medium drive actuator 509 for driving a memory medium 508 (a description will be given later of the memory medium), a condensing lens 510 for condensing scattered light scattered by the surface of the memory medium for respective wavelengths, a high-speed rotary polarizer 511 and a light receiving element 512 for the wavelength $\lambda 1$ for receiving scattered light of the wavelength λ1. The head 506 is provided with a very small aperture 513 for data access for generating near-field light and having a function of a quarter wavelength plate. Further, there are provided an output signal processing circuit 514 and a control circuit 515 as means for processing a signal acquired by the light receiving element 510 for the wavelength λ1.

The output signal processing circuit comprises a memory for storing a maximum value of an output signal and a phase in providing the maximum value during one period of rotating polarized light by the high-speed rotary polarizer 502, an operating circuit for comparing the output signal with the maximum value from start to current time of the period and an operating circuit for calculating an angle of a mark edge 518 from the phase. Thereby, the angle of the mark edge is calculated from time (phase in rotating polarized light) when the output signal provides the maximum value during one rotation of the polarized light.

Further, an access/tracking control system of the head 506 is constituted similar to that in Embodiment 1 and an explanation thereof will be omitted here.

As shown by FIG. 15, the memory medium 508 is formed with two kinds of phases 516 and 517 and records information in accordance with positions of the two phases and the angle of the interface 518. The interface 518 is formed by removing a resist by a irradiating electron beam and the edge is formed by the interface 518.

Next, an explanation will be given of operation of the information reproducing apparatus 500. The high-speed rotary polarizers 502 and 511 can control the direction of polarization of the laser light by applying voltage. When polarized light of the laser light R1 is rotated, a direction of polarization of near-field light generated from the very small aperture 513 for data access is also rotated in a state of a shift of one wavelength. When a data mark (the interface 518 constituting the mark edge) on the memory medium 508 is irradiated with the near-field light while rotating the polarized light of the near-field light, a data output is intensified at a specific rotational angle. The principle is as described in Embodiment 1. The rotational speed of the high-speed rotary polarizers 502 and 511 are set such that the high-speed rotary polarizers are rotated at least by a half rotation during a time period of scanning one of the interfaces 518.

Figure 16:
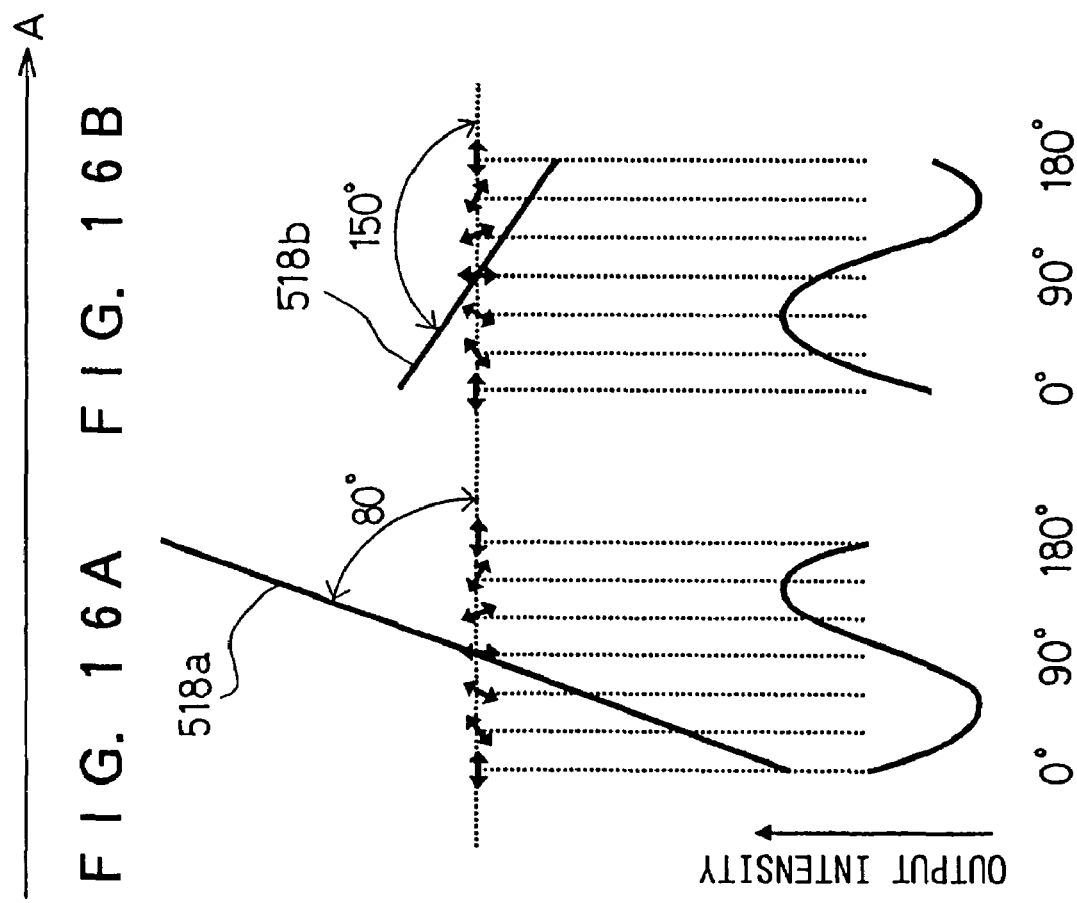
FIGS. 16A-16B are explanatory views showing states of data acquisition.

FIG. 16 shows states of data acquisition. For example, when the polarized light is rotated by one rotation in a procedure for scanning one of the interfaces 518 (mark edges) (scanning direction is designated by arrow mark A in the drawing), the output signal is intensified at a position at which the direction of polarization becomes orthogonal to an interface 518*a*. The interface 518 shown in (a) of the drawing is inclined by 80 degrees from the horizontal direction. Therefore, when the direction of polarization of the near-field light is at 170 degrees, the output signal is maximized. An interface 518*b* shown in (b) of the drawing is inclined by 150 degrees from the horizontal direction. Therefore, when the direction of polarization is at 60 degrees, the output signal is maximized. In this way, when (a) and (b) of the drawing are compared, it is known that the interfaces 518 having different inclinations show maximum output intensities respectively in different directions of polarization.

Therefore, by providing the angle to one of the interfaces 518, the signal output in accordance with the angle can be provided. That is, when a value of data is calculated from the angle of polarization maximizing the output signal, multiple value formation is made feasible. For example, accuracy of miniature machining technology by electron beam is several tens nanometers and the angle of the interface 518 can be constituted by an accuracy of 10 degrees and accordingly, in this case, values of 0 through 17 can be acquired from one of the interfaces 518. Therefore, multiple value formation can be promoted outstandingly.

Embodiment 6

Figure 17:
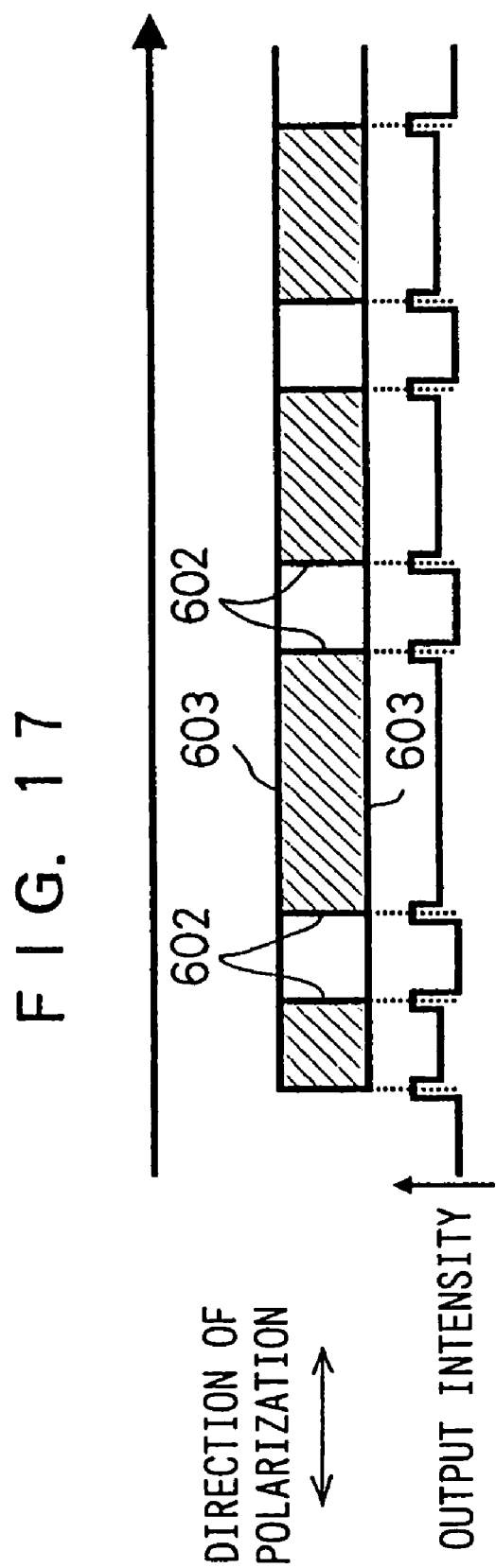
FIG. 17 is an explanatory view showing a mode of a memory medium and a signal output used in an information reproducing apparatus according to Embodiment 6 of the invention.

In the case of an information reproducing apparatus according to Embodiment 6, information is expressed by an edge interval of a rectangular data mark by utilizing the fact that near-field light is scattered at an interface (mark edge) on the memory medium and a signal output is locally increased (mark edge record). FIG. 17 is an explanatory view showing a mode of a memory medium used in the information reproducing apparatus according to Embodiment 6 of the invention and a signal output. When a memory medium 601 is scanned by near-field light polarized in the left and right direction of the drawing, the signal output is intensified at portions of interfaces 602. Further, when the memory medium is scanned by near-field light polarized in the up and down direction, phases 603 of a sample layer in the up and down direction are emphasized. This may be used for tracking a head. Further, although apparatus constitution may be the same as that of Embodiment 1 (not illustrated), there is needed a circuit of processing a value in correspondence with the edge interval.

Embodiment 7

FIG. 18 is an explanatory view showing an information reproducing apparatus according to Embodiment 7 of the invention. According to the information reproducing apparatus, data access is executed by one side of a data mark in a rectangular shape and tracking is executed by other side thereof. The apparatus constitution is substantially similar to that of Embodiment 5 and therefore, an explanation thereof will be omitted. Further, according to the invention, a point in which information is recorded by an edge interval of a data mark 701 is similar to that of Embodiment 6.

In the drawing, bold lines designate positions of a very small aperture 702 for data access in outputting linearly polarized light in parallel with a scanning direction (arrow mark A in the drawing) (in the horizontal direction). Dotted lines designate positions of a very small aperture 703 for data access in outputting linearly polarized light orthogonal to the scanning direction (vertical direction). Laser light scans a data mark by rotating the direction of polarization at high speed by a high-speed rotary polarizer. At an initial edge 704, when linearly polarized light of near-field light is in the horizontal direction, the signal intensity is intensified in accordance with a rotational timing of the linearly polarized light (the position as shown in FIG. 18A). Further, also at a final edge 705, when the linearly polarized light of the near-field light is in the horizontal direction, the signal intensity is intensified in accordance with the rotational timing of the linearly polarized light (the position as shown in FIG. 18B).

Meanwhile, when the very small aperture 703 is disposed above the data mark 701, there is no peak of the signal output since there is no edge. However, as shown by the drawing, when the head is shifted and the position of the very small aperture 703 for data access is moved in the vertical direction, an influence is effected by an edge 706 in the horizontal direction of the data mark 701. That is, when the linearly polarized light of the near-field light is in the vertical direction, the signal intensity is intensified in accordance with a rotational timing of the linearly polarized light (the position as shown in FIG. 18*c*).

A control circuit controls a head position by feedback control such that there is no signal output at the rotational timing related to the vertical direction.

In this way, data access and tracking of head can be executed simultaneously.

Embodiment 8

Figure 19:
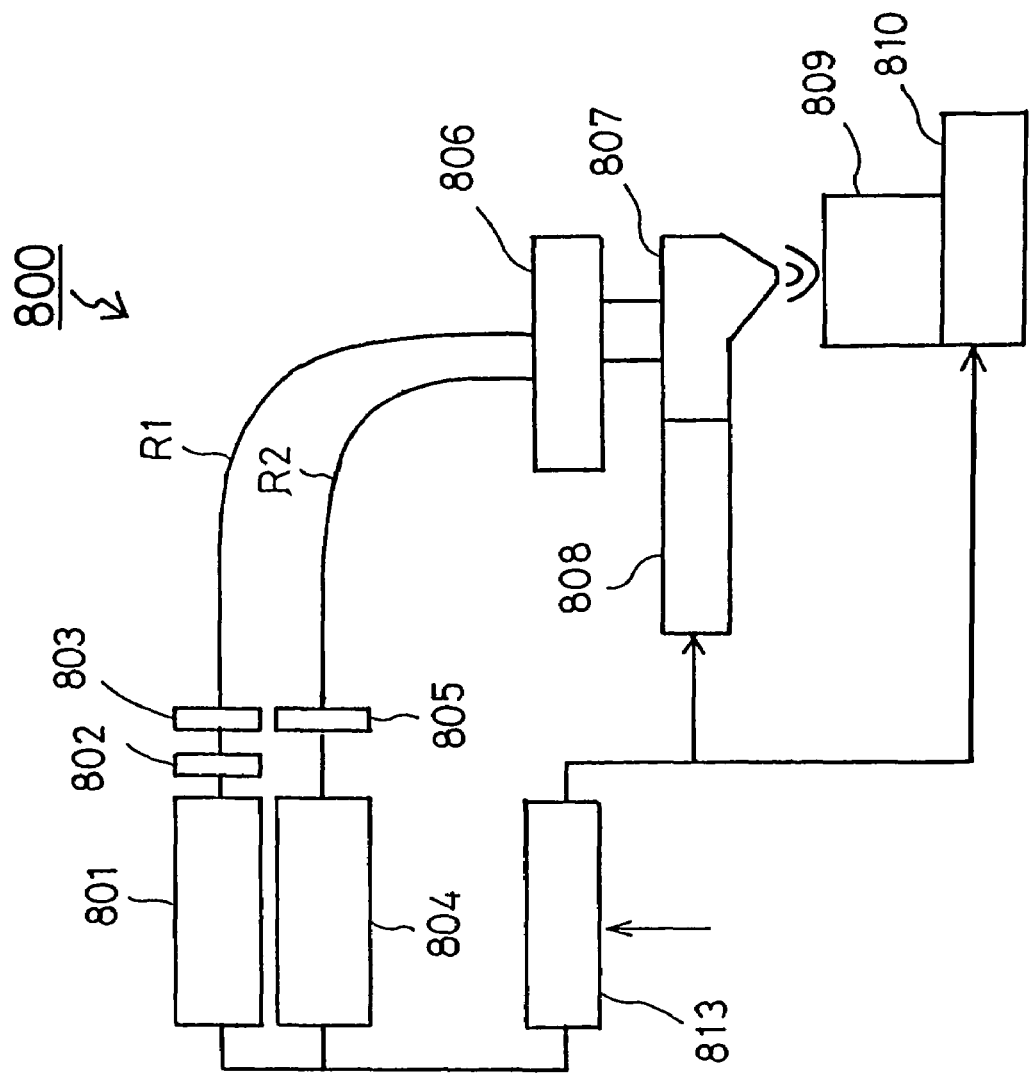
FIG. 19 is an outline constitution view showing an information recording apparatus according to Embodiment 8 of the invention.

FIG. 19 is an outline constitution view showing an information recording apparatus according to Embodiment 8 of the invention. FIG. 20 is an explanatory view showing principle of information recording in the information recording apparatus shown in FIG. 19. The information recording apparatus 800 is featured in that information of 4 bits is recorded to a unit pit and is provided with a wavelength $\lambda 11$ laser oscillator 801 for outputting laser light having a wavelength $\lambda 1$ used for data access, a half wavelength plate 802 and a quarter wavelength plate 803 arranged on an optical axis of the laser of the wavelength $\lambda 1$ for converting a direction of polarization of the laser light, a wavelength $\lambda 2$ laser oscillator 804 for outputting laser light having a wavelength $\lambda 2$ used for data access and a quarter wavelength plate 805 arranged on an optical axis of the laser of the wavelength $\lambda 2$ for converting a direction of polarization of the laser light.

Further, the information recording apparatus 800 is provided with a wave guide 806 for transmitting laser light of the respective wavelengths, a head 807 installed to connect to the wave guide 806, a head drive actuator 808 for driving the head 807 and a memory medium drive actuator 810 for driving a memory medium 809 (a description will be given later of the memory medium). The head 807 is installed in series with two of a very small aperture 811 for first data access and a very small aperture 812 for second data access for generating near-field light and having a function of a quarter wavelength plate.

Further, there is provided a control circuit 813 for controlling the two laser oscillators 801 and 804 based on input signals and controlling the head drive actuator 808 and the memory medium drive actuator 810. Further, there are provided a head drive circuit for executing access/tracking of the head 807 and a read data output control circuit for outputting read data (not illustrated).

On a surface of the memory medium 809, as shown by (a) of FIG. 20, there is formed a substance the state of which is changed by local heating, for example, a phase change film 814 used in a phase change recording system. The phase change film 814 is provided with a shape in which slender rectangular shapes constitute a cross.

Next, an explanation will be given of operation of the information recording apparatus 800. As shown by (b1) of FIG. 20, the I1 wavelength laser oscillator 801 oscillates laser light based on the input signal. Laser light R1 outputted from the I1 wavelength laser oscillator 801, passes through the half wavelength plate 802 and the quarter wavelength plate 803 and becomes near-field light polarized in the horizontal direction (arrow mark direction A in the drawing) at the very small aperture 811 for the first data access. When the near-field light polarized in the horizontal direction is irradiated on the memory medium 809, only a portion 814a of the phase change film 814 elongated in the vertical direction strongly reacts therewith and brings about phase change. Meanwhile, a portion 814b thereof elongated in the horizontal direction does not react therewith and accordingly, the phase change is not brought about.

Similarly, as shown by (b2) of FIG. 20, the I2 wavelength laser oscillator 804 oscillates laser light R2 based on the input signal. The laser light R2 outputted from the I2 wavelength laser oscillator 804 passes through the half wavelength plate 805 and becomes near-field light polarized in the vertical direction at the very small aperture 812 for the second data access. When the near-field light polarized in the vertical direction is irradiated on the memory medium 809, only the portion 814b of the phase change film elongated in the horizontal direction strongly reacts therewith and brings about the phase change. Meanwhile, the portion 814a elongated in the vertical direction does not react therewith and accordingly, the phase change is not brought about.

Further, in the case in which both of the I1 wavelength laser oscillator 801 and the I2 wavelength laser oscillator 804 are used, the portions 814a and 814b elongated in the vertical direction and the horizontal direction bring about the phase change. The memory medium in a state in which data is recorded finally is shown by (c) of FIG. 20. ON/OFF of the I1 wavelength laser oscillator 801 and the I2 wavelength laser oscillator 804 is executed independently from each other based on information signals by the control circuit 813.

As described above, according to the information recording apparatus 800, information of a maximum of 4 bits can be provided to a unit pit and accordingly, multiple value formation is feasible and the recording density can be promoted outstandingly. Further, although according to the above-described, there are used the laser oscillators having different wavelengths, a single one of the laser oscillator may be constituted, output light therefrom may be branched and one of the branched laser light may be polarized by a polarizing plate.

Embodiment 9

Further, in Embodiment 8, mentioned above, a single of a very small aperture for data access may be formed at the head and the same data mark area may be scanned again and recorded after rotating the direction of polarization (not illustrated). For example, on a memory medium having a shape of a circular disk, a phase change film may be subjected to phase change in the vertical direction by initial scanning and the same track may be scanned again as it is to thereby bring about phase change in the horizontal direction. In rotating the direction of polarization, there is used a high-speed rotary polarizer a rotational direction of which can be controlled by applying voltage and the high-speed rotary polarizer is made to be synchronized with rotation of the memory medium. In this way, multiple value formation similar to that in Embodiment 8 is feasible and the recording density can be promoted outstandingly.

Embodiment 10

FIG. 21 is an outline constitution view showing an information recording apparatus according to Embodiment 10 of the invention. FIG. 22 is an explanatory view showing principle of information recording in the information recording apparatus shown in FIG. 21. The information recording apparatus 1000 is featured in that near-field light is irradiated while rotating a direction of polarization at high speed and an inclination is provided at a phase change portion on a memory medium and is provided with a wavelength $\lambda 1$ laser oscillator 1001 for outputting laser light having a wavelength $\lambda 1$ used for data access, a high-speed rotary polarizer 1002 comprising an electro-optical element of KDP (potassium phosphate) or the like for rotating a direction of polarization of laser light at high speed, a half wavelength plate 1003 and a quarter wavelength plate 1004 arranged on an optical axis of the laser of the wavelength $\lambda 1$ for converting the direction of polarization of the laser light, a wave guide 1005 for transmitting the laser light and a head 1006 installed to connect to the wave guide 1005.

Further, the information recording apparatus 1000 is provided with a head drive actuator 1007 for driving the head 1006 and a memory medium drive actuator 1009 for driving a memory medium 1008 (a description will be given of the memory medium). The head 1006 is provided with a very small aperture 1010 for generating near-field light and having a function of a quarter wavelength plate. Further, there is provided a control circuit 1011 for controlling the wavelength λ1 laser oscillator 1001, the high-speed rotary polarizer 1002, the memory medium drive actuator 1009 and the head drive actuator 1007.

On the memory medium 1008, there is formed a phase change film 1012 for bringing about phase change by irradiating light and used for phase change record of, for example, Ge—Sb—Te. The phase change film 1012 is provided with a shape in which slender rectangular shapes are arranged in a radial shape and the phase change film 1012 comprising the shape constitutes a unit pit.

Next, an explanation will be given of operation of the information recording apparatus 1000. The direction of polarization of laser light is rotated at high speed by the high-speed rotary polarizer 1002 and laser light R1 is irradiated when a rotational angle of polarization becomes an arbitrary value. For example, in (1) of (a) of the drawing, when the direction of polarization becomes a direction of 90 degrees relative to a scanning direction of the head, the wavelength λ1 laser oscillator 1001 is made ON ((b) of the drawing) and near-field light is irradiated on the phase change film. Thereby, only a portion 1012a of the phase change film 1012 elongated in the horizontal direction strongly reacts therewith and brings about phase change ((c) of the drawing). Meanwhile, portions thereof 1012b and 1012c elongated in other directions do not react therewith and accordingly, phase change is not brought about.

Further, in (2) of (a) of the drawing, when the direction of polarization becomes 135 degrees, the wavelength λ1 laser oscillator 1001 is made ON ((b) of the drawing) and near-field light is irradiated on the phase change film. Thereby, only the portion 1012b of the phase change film elongated in 45 degrees direction strongly reacts therewith and brings about phase change ((c) of the drawing). Similar to the above-described, the portions 1012a and 1012c elongated in the other direction do not react therewith and therefore, the phase change is not brought about.

As described above, according to the information recording apparatus 1000, the unit pit can be provided with information of at least 4 bits or more and accordingly, multiple value formation is feasible and the recording density can be promoted outstandingly.

Embodiment 11

FIG. 23 is an explanatory view showing recording principle of an information recording apparatus according to Embodiment 11 of the invention. In Embodiment 10, mentioned above, irradiation of near-field light to the memory medium 1008 may be carried out by plural times for one unit pit. For example, as shown by (a) of the drawing, when the near-field light is generated at 45 degrees and 90 degrees ((b) of the drawing), two of data marks 1012a and 1012d having different angles can be formed at the phase change film 1012 ((c) of the drawing).

In this way, the recording density can further be promoted. Further, when data marks are formed not at every 45 degrees but at every 10 degrees, the unit pit can be recorded with information of 18 bits.

Although according to embodiments 8 through 11, recording is carried out by using a material for bringing about phase change by heating, in the case of a material the state of which is changed by near-field light, the invention can be utilized as it is.

Embodiment 12

Figure 24:
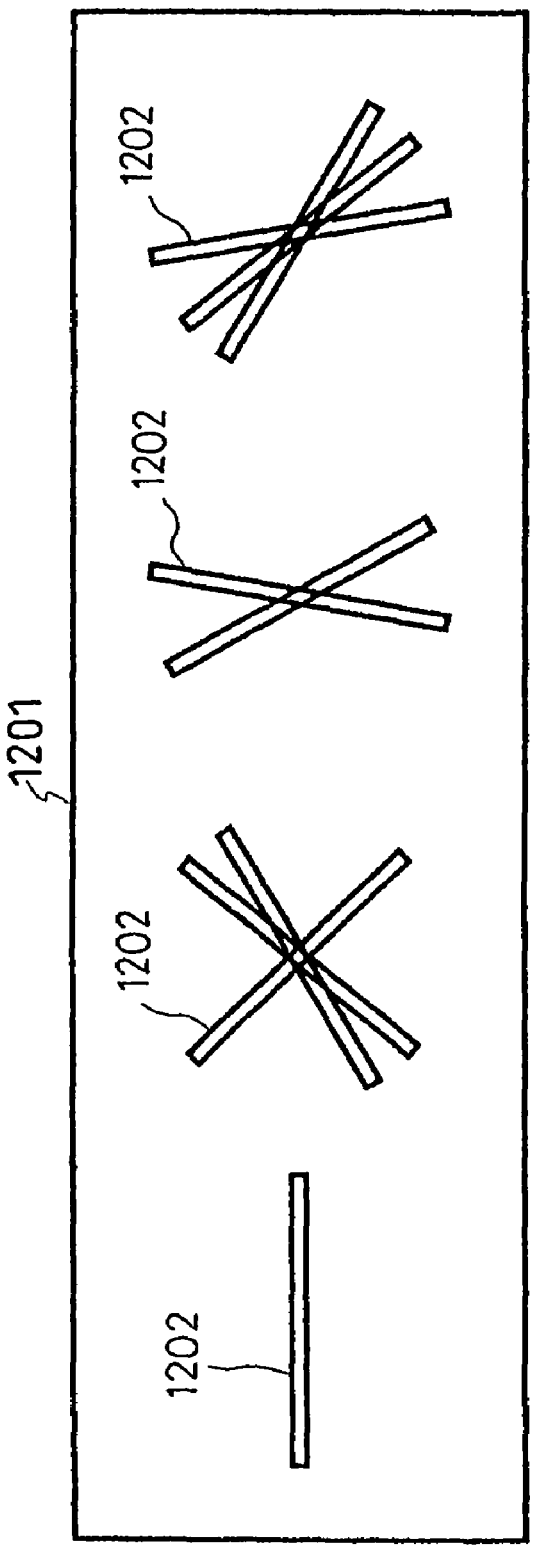
FIGS. 24A-24D explanatory views showing modes of a memory medium in an information recording apparatus according to Embodiment 12.

Although according to an information reproducing apparatus of Embodiment 12, a constitution of an information recording medium is substantially the same as that of Embodiment 5, there is a difference therebetween in that a mode of a data mark of a memory medium is constituted by a slender rectangular shape having a predetermined angle as in Embodiment 11. By constituting the data mark by such a mode, in comparison with the case in which edges of a data mark having a rectangular shape are used, further multiple value formation can be constituted. FIG. 24 is an explanatory view showing a mode of a memory medium according to the information recording apparatus. On a memory medium 1201, a plurality of data marks 1202 are formed in different directions with 10 degrees as a minimum unit. Near-field light is rotated at high speed by a high-speed rotary polarizer. An output signal shows a maximum value when rotating polarized light is disposed orthogonal to the data mark 1202.

Figure 25:
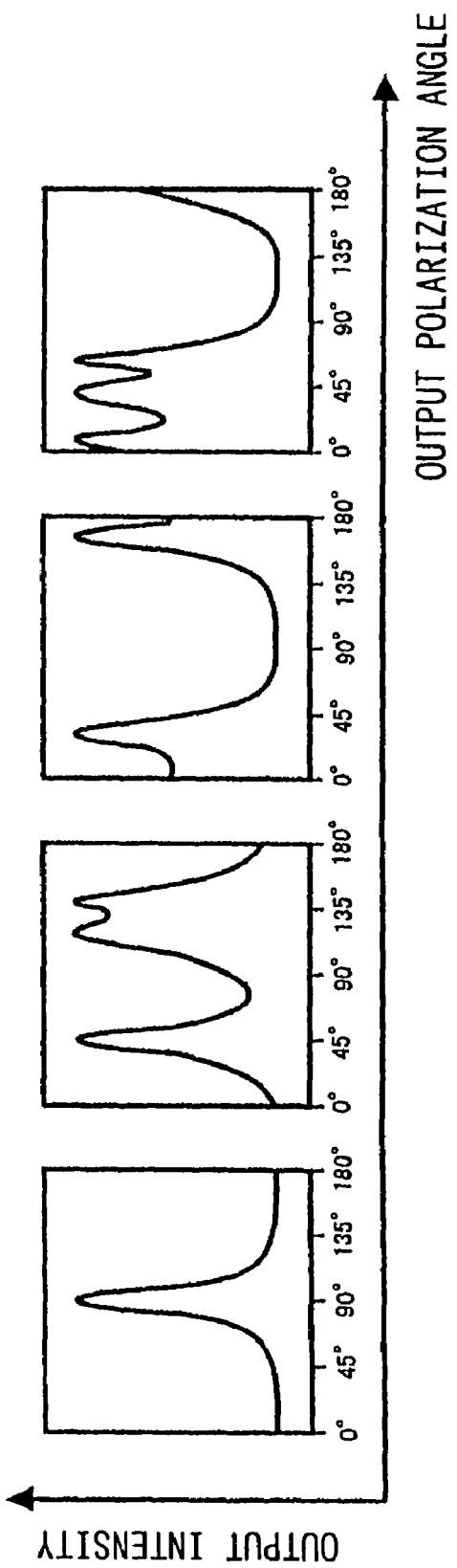
FIGS. 25A-25D are explanatory views showing states of an output signal of the information recording apparatus of FIG. 24.

In FIG. 24A, the data mark 1202 is formed in the horizontal direction and accordingly, when the polarized light is at 90 degrees, the output signal is maximized (refer to (a) of FIG. 25). In FIG. 24B, there are formed three of the data marks 1202 and the respective data marks 1202 are provided with angles of 30 degrees, 50 degrees and 135 degrees. Therefore, when the polarized light is in directions of 120 degrees, 140 degrees and 45 degrees, the output signal is maximized (refer to (b) of FIG. 25). Also with regard to FIG. 24C and FIG. 24D, the maximum output signal is provided at rotational angles of the angles of the respective data marks 1202 added with 90 degrees (refer to (c) and (d) of FIG. 25). In this way, by forming the data marks 1202 by changing the angle at every 10 degrees, information of 18 bits can be recorded to a unit pit (several hundreds square nanometers). Other operation of the information reproducing apparatus according to Embodiment 12 is similar to that of Embodiment 5 and therefore, an explanation thereof will be omitted.

As has been explained, according to an information reproducing apparatus of the invention, a mark is irradiated with near-field light of linearly polarized light orthogonal to the mark and scattered light scattered by the mark is acquired as an output signal and accordingly, a recording density can be promoted.

Next, according to an information reproducing apparatus of the invention, a plurality of marks of edges in a linear shape or the like are formed on a medium while changing directions thereof and the marks are irradiated with near-field light of linearly polarized light to thereby respectively provide output signals from the respective marks and therefore, the recording density can be promoted.

Next, according to an information reproducing apparatus of the invention, a tracking mark in a linearly shape is formed in a scanning direction, near-field light of linearly polarized light orthogonal to the scanning direction is irradiated along the tracking mark and therefore, when a very small aperture for tracking is shifted from the tracking mark, an intensity of an output signal is changed. Therefore, tracking in reproduction can be executed based on the output signal. Further, when the tracking mark is formed in a direction different from a direction of a data mark, the tracking mark can be detected separately from the data mark and accordingly, the recording density can be promoted by an amount of saving a tracking mark area.

Next, according to an information reproducing apparatus of the invention, a tracking mark is formed in a scanning direction and a data mark is formed in a direction orthogonal to the scanning direction and the respective marks are irradiated with near-field light having linearly polarized light orthogonal to the respective marks to thereby provide output signals. Therefore, an area of the tracking mark can be reduced by forming the tracking mark and the data mark at a single pit or the like and accordingly, the recording density can be promoted by that amount.

Next, according to an information reproducing apparatus of the invention, a data mark in a scanning direction and a data mark in a direction orthogonal to the scanning direction are scanned by near-field light of linearly polarized light orthogonal to the respective data marks. An output signal is intensified with regard to the data mark orthogonal to a direction of polarization of the near-field light and accordingly, the data marks having directions of forming thereof different from each other can be detected respectively separately. Therefore, data can be constituted by multiple value formation and accordingly, the recording density can be promoted.

Next, according to an information reproducing apparatus of the invention, a data mark formed in a scanning direction is irradiated with near-field light of linearly polarized light orthogonal to the scanning direction to thereby provide an output signal, successively, a direction of polarization is rotated by polarized light rotating means and a data mark formed in a direction orthogonal to the scanning direction is irradiated with near-field light linearly polarized in the scanning direction to thereby provide an output signal. Therefore, the data marks in different directions are formed as a unit pit to thereby enable to promote the recording density. Further, an optical system is constituted by one route and therefore, apparatus constitution is simplified.

Next, according to an information reproducing apparatus of the invention, either one of the first data and the second data is subjected to bit shift and added to other thereof and accordingly, multiple value recording is made feasible and the recording density can be promoted.

Next, according to an information reproducing apparatus of the invention, the medium is scanned while irradiating near-field light a direction of polarization of which is rotating to data marks, scattered light scattered by the data marks constitutes output signals and multiple value data is acquired from intensities of the output signals and rotational angles of the direction of polarization. In this way, even when the data marks having different directions of forming thereof are formed at a unit pit, the data marks can separately be detected and therefore, multiple value formation is feasible and the recording density is promoted. Further, an optical system is constituted by one route and therefore, the apparatus structure is simplified.

Next, according to an information reproducing apparatus of the invention, based on recorded information, data marks in a linear shape are formed on a medium at predetermined intervals and the medium is scanned while irradiating the data marks with near-field light having linearly polarized light substantially orthogonal to the data marks. The data marks are detected by the above-described principle, the data marks are in the linear shape and accordingly, the data marks can be formed on the medium by a number larger than a number of conventional pits substantially in an elliptic shape. Therefore, the recording density can be promoted.

Next, according to an information reproducing apparatus of the invention, a plurality of data marks directed in different directions are provided as one unit, the data marks are irradiated with near-field light while rotating a direction of polarization thereof, multiple value data is acquired from intensities of output signals and, rotational angles of the direction of polarization and therefore, the recording density can be promoted.

Next, according to an information recording apparatus of the invention, a direction of polarization of near-field light having linearly polarized light is changed based on recorded information and while changing the direction of polarization, near-field light is irradiated on a medium a surface of which is provided with a substance a state of which is changed by local heating. In this way, data marks having different directions can be formed at the same position and accordingly, multiple value formation is made feasible and the recording density can be promoted.

According to an information recording apparatus of the invention, first data is recorded by irradiating a medium with near-field light polarized in a scanning direction by a very small aperture for first data recording and changing a state in a direction orthogonal to the second direction, similarly, second data is recorded by irradiating a medium with near-field light polarized in a direction orthogonal to the scanning direction by a very small aperture for second data recording and changing a state thereof in the scanning direction. Therefore, the first and the second data can be recorded at the same position and accordingly, the recording density is promoted.

Next, according to an information recording apparatus of the invention, first data is recorded by irradiating a medium with near-field light polarized in a scanning direction by a very small aperture for data recording and changing a state thereof in a direction orthogonal to the scanning direction, successively, second data is recorded by irradiating the medium with near-field light polarized in a direction orthogonal to the scanning direction and changing the state in the scanning direction. Further, directions of recording the first data and the second data may be reversed. In this way, information can be recorded by multiple value data at the same position and therefore, the recording density can be promoted.

Next, according to an information recording apparatus of the invention, irradiation of near-field light, is controlled by a unit of a predetermined rotational angle based on recorded information and a state of a medium in a direction orthogonal to a direction of polarization of the near-field light is changed by the unit of the rotational angle. Therefore, the recording density can be promoted.

Next, according to an information recording apparatus of the invention, in the above-described information recording apparatus, the unit of the rotational angle is made to be equal to or larger than 10 degrees and accordingly, information can be recorded accurately.

Next, according to an information reproducing apparatus of the invention, a phase plate is used, directions of polarization of near-field light generated from a first very small aperture and a second very small aperture are made to differ from each other and accordingly, marks of edges or the like having different directions of forming thereof can be detected separately for tracking and for data access. Therefore, even in the case of a recording medium in which a tracking mark and a data mark are formed at the same position, reproduction of information and tracking can be executed.

Next, according to an information reproducing apparatus of the invention, a phase plate is used, directions of polarization of finally generated near-field light are made to differ from each other and accordingly, marks of edges or the like having different directions of forming thereof can separately be detected. Therefore, promotion of the recording density can be achieved.

Next, according to an information reproducing apparatus of the invention, there are provided a laser oscillator used for data access, a very small aperture for generating near-field light having linearly polarized light from laser light from the laser oscillator and polarized light controlling means for controlling a direction of polarization of the near-field light and therefore, marks of edges or the like having different directions of forming thereof can separately be detected by a simple constitution. Therefore, promotion of the recording density can be achieved.

Next, according to a recording medium of the invention, a data mark of an edge or the like formed in one direction and a data mark of an edge or the like formed in a direction different from the direction are provided on a track. Therefore, by separately detecting the two data marks, the recording density can be promoted.

Next, according to a recording medium of the invention, phase change layers in a longitudinal shape a state of each of which is changed by local heating are formed in a plurality of directions on a track and accordingly, multiple value formation of data is feasible and the recording density can be promoted.

Next, according to an information reproducing method of the invention, near-field light of linearly polarized light orthogonal to a mark is irradiated on the mark and scattered light scattered by the mark is acquired as an output signal and accordingly, the recording density can be promoted.

Next, according to an information reproducing method of the invention, a plurality of marks of edges in a linear shape of the like are formed on a medium while changing directions thereof, the marks are irradiated with near-field light of linearly polarized light to thereby respectively provide output signals from the respective marks and therefore, the recording density can be promoted.

Next, according to an information reproducing method of the invention, a tracking mark in a linear shape is formed in a scanning direction, the tracking mark is irradiated with near-field light of linearly polarized light orthogonal to the scanning direction along the tracking mark and accordingly, when the near-field light is shifted from the tracking mark, an intensity of an output signal is changed. Therefore, tracking in reproduction can be carried out based on the input signal. Further, when the tracking mark is formed in a direction different from a direction of a data mark, the tracking mark can be detected separately from the data mark and accordingly, the recording density can be promoted by an amount of saving a tracking mark area.

Next, according to an information reproducing method of the invention, a tracking mark is formed in a scanning direction, a data mark is formed in a direction orthogonal to the scanning direction and the respective marks are irradiated with near-field light having linearly polarized light orthogonal to the respective marks to thereby provide output signals. Therefore, an area of the tracking mark can be reduced by forming the tracking mark and the data mark at a single pit or the like and accordingly, the recording density can be promoted by that amount.

Next, according to an information reproducing method of the invention, a data mark in a scanning direction and a data mark in a direction orthogonal to the scanning direction are scanned by near-field light of linearly polarized light orthogonal to the respective data marks. An output signal is intensified with regard to the data mark orthogonal to a direction of polarization of the near-field light and accordingly, the data marks having directions of forming thereof different from each other can respectively be detected separately. Therefore, multiple value formation can be constituted by data and accordingly, the recording density can be promoted.

Next, according to an information reproducing method of the invention, an output signal is provided by irradiating a data mark formed in a scanning direction with near-field light of linearly polarized light orthogonal to the scanning direction, successively, a direction of polarization is rotated by polarized light rotating means and an output signal is provided by irradiating a data mark formed in a direction orthogonal to the scanning direction with near-field light linearly polarized in the scanning direction. Therefore, the recording density can be promoted by forming the data marks having different directions as a unit pit.

Next, according to an information reproducing method of the invention, either one of the first data and the second data is subjected to bit shift and added to other thereof and therefore, multiple value recording is made feasible and the recording density can be promoted.

Next, according to an information reproducing method of the invention, the medium is scanned by irradiating data marks with near-field light a direction of polarization of which is rotating, scattered light scattered by the data marks constitutes output signals and multiple value data is acquired from intensities of the output signals and rotational angles of the direction of polarization. In this way, even when the data marks having different directions of forming thereof are formed at a unit pit, the data marks can separately be detected and accordingly, multiple value formation is feasible and the recording density is promoted.

Next, according to an information reproducing method of the invention, data marks in a linear shape are formed on a medium at predetermined intervals based on recorded information and the medium is scanned while irradiating the data marks with near-field light having linearly polarized light substantially orthogonal to the data marks. The data marks are detected by the above-described principle and the data marks are formed in the linear shape and accordingly, the data marks can be formed on the medium by a number larger than a number of conventional pits substantially in an elliptic shape. Therefore, the recording density can be promoted.

Next, according to an information reproducing method of the invention, a plurality of data marks directed in different directions are provided as one unit, the data marks are irradiated with near-field light while rotating a direction of polarization, multiple value data is acquired from intensities of output signals and rotational angles of the direction of polarization and accordingly, the recording density can be promoted.

Next, according to an information recording method of the invention, a direction of polarization of near-field light having linearly polarized light is changed based on recorded information and while changing the direction of polarization, the near-field light is irradiated on a medium a surface of which is provided with a substance a state of which is changed by local heating. In this way, data marks having different directions can be formed at the same position and accordingly, multiple value formation is made feasible and the recording density can be promoted.

Next, according to an information recording method of the invention, first data is recorded by irradiating a medium with near-field light linearly polarized in a scanning direction and changing a state thereof in a direction orthogonal to the scanning direction, similarly, second data is recorded by irradiating the medium with near-field light linearly polarized in a direction orthogonal to the scanning direction and changing the state in the scanning direction. Therefore, the first and the second data can be recorded at the same position and accordingly, the recording density is promoted.

Next, according to an information recording method of the invention, first data is recorded by irradiating a medium with near-field light polarized in a scanning direction and changing a state thereof in a direction orthogonal to the scanning direction, successively, second data is recorded by irradiating the medium with near-field light polarized in a direction orthogonal to the scanning direction and changing the state in the scanning direction. Further, directions of recording the first data and the second data may be reversed. In this way, information can be recorded by multiple value data at the same position and accordingly, the recording density can be promoted.

Next, according to an information recording method of the invention, irradiation of near-field light is controlled by a unit of a predetermined rotational angle based on recorded information and a state of a medium in a direction orthogonal to a direction of polarization of the near-field light is changed by the unit of the rotational angle. Therefore, the recording density can be promoted.

Next, according to an information recording method of the invention, in the above-described information recording method, the unit of the rotational angle is made to be equal to or larger than 10 degrees and accordingly, information can be recorded accurately.

The invention claimed is:

1. An information reproducing apparatus comprising:
   a light source for generating linearly polarized light;
   a medium having an information unit field and a plurality of linear marks disposed in the information unit field in overlapping relation to one another and extending in different directions from one another;
   an optical head disposed between the light source and the medium, the optical head having a fine aperture;
   polarized light control means for controlling the linearly polarized light generated by the light source to pass through the fine aperture of the optical head to generate near-field light having a preselected polarization direction and to irradiate the linear marks in the information unit field of the medium with the near-field light so that the preselected polarization direction of the near-field light is orthogonal to a longitudinal axis of each of the linear marks;
   a detector for detecting light scattered by the linear mark irradiated with the near-field light; and
   a signal processing circuit that processes a signal from the detector corresponding to the detected scattered light, the signal processing circuit having a control circuit having a head drive circuit for carrying out access/tracking control of the optical head and a read data output control circuit for outputting read data.

2. An information reproducing apparatus according to claim 1; wherein the signal processing circuit acquires data in accordance with an intensity of the signal from the detector corresponding to the detected scattered light.

3. An information reproducing apparatus according to claim 1; wherein the plurality of linear marks comprise a plurality of linear data marks and a plurality of tracking marks disposed in overlapping relation to the plurality of linear data marks; and wherein the signal processing circuit has a difference circuit that calculates a difference of signals for tracking and a read data signal processing circuit for processing a signal for data access, the difference circuit providing to the head drive circuit signals that control a head drive actuator that drives the optical head.

4. An information reproducing apparatus according to claim 1; wherein each of the linear marks comprises a projection having a linear edge; wherein the near-field light irradiates each projection so that the preselected polarization direction of the near-field light is orthogonal to a longitudinal axis of the linear edge of each projection; and wherein the detector detects light scattered by the linear edge of each projection irradiated with near-field light.

5. An information reproducing apparatus according to claim 1; wherein each of the linear marks comprises a groove having a linear edge formed in the medium; wherein the near-field light irradiates each groove so that the preselected polarization direction of the near-field light is orthogonal to a longitudinal axis of the linear edge of each groove; and wherein the detector detects light scattered by the linear edge of each groove irradiated with near-field light.

6. An information reproducing apparatus according to claim 1; wherein each of the linear marks comprises a plurality of substances having a linear interface and formed in a planar surface of the medium, the substances having a different optical property from that of the medium; wherein the near-field light irradiates each substance so that the preselected polarization direction of the near-field light is orthogonal to a longitudinal axis of the linear interface of each substance; and wherein the detector detects light scattered by the linear interface of each substance irradiated with near-field light.

7. An information reproducing apparatus according to claim 6; wherein the different optical property is a different refractive index.

8. An information reproducing apparatus comprising:
   a light source for generating linearly polarized light;
   a medium having an information unit field and a plurality of linear marks disposed in the information unit field in overlapping relation to one another and extending in different directions from one another;
   an optical head disposed between the light source and the medium, the optical head having a fine aperture;
   polarized light control means for controlling the linearly polarized light generated by the light source to pass through the fine aperture of the optical head to generate near-field light and to irradiate the linear marks disposed in the information unit field of the medium with the near-field light, and for controlling a direction of polarization of the near-field light so that the direction of polarization of the near-field light irradiated on the linear marks is orthogonal to a longitudinal axis of each of the linear marks;
   a detector for detecting light scattered by the linear marks irradiated with the near-field light; and
   a signal processing circuit that processes a signal from the detector corresponding to the detected scattered light, the signal processing circuit having a control circuit having a head drive circuit for carrying out access/tracking control of the optical head and a read data output control circuit for outputting read data.

9. An information reproducing apparatus according to claim 8; wherein the signal processing circuit acquires multiple value data from the signal.

10. An information reproducing apparatus according to claim 8; wherein the plurality of linear marks comprise linear data marks and a plurality of tracking marks disposed in overlapping relation to the plurality of linear data marks; and wherein the signal processing circuit has a difference circuit that calculates a difference of signals for tracking and a read data signal processing circuit for processing a signal for data access, the difference circuit providing to the head drive circuit signals that control a head drive actuator that drives the optical head.

11. An information reproducing apparatus according to claim 8; wherein each of the linear marks comprises a projection having a linear edge; wherein the near-field light irradiates each projection so that the preselected polarization direction of the near-field light is orthogonal to a longitudinal axis of the linear edge of each projection; and wherein the detector detects light scattered by the linear edge of each projection irradiated with near-field light.

12. An information reproducing apparatus according to claim 8; wherein each of the linear marks comprises a groove having a linear edge formed in the medium; wherein the near-field light irradiates each groove so that the preselected polarization direction of the near-field light is orthogonal to a longitudinal axis of the linear edge of each groove; and wherein the detector detects light scattered by the linear edge of each groove irradiated with near-field light.

13. An information reproducing apparatus according to claim 8; wherein each of the linear marks comprises a plurality of substances having a linear interface and formed in a planar surface of the medium, the substances having a different optical property from that of the medium; wherein the near-field light irradiates each substance so that the preselected polarization direction of the near-field light is orthogonal to a longitudinal axis of the linear interface of each substance; and wherein the detector detects light scattered by the linear interface of each substance irradiated with near-field light.

14. An information reproducing apparatus according to claim 13; wherein the different optical property is a different refractive index.

15. An information reproducing apparatus comprising:
a medium having a plurality of information unit fields and a plurality of linear marks disposed in each of the information unit fields in overlapping relation to one another and extending in different directions from one another;
an optical head disposed over the medium and having a fine aperture;
light generating means for generating linearly polarized light and directing the linearly polarized light through the fine aperture of the optical head to generate near-field light and to irradiate at least one of the linear marks in the information unit fields of the medium with the near-field light;
control means for controlling a direction of polarization of the near-field light so that the direction of polarization of the near-field light irradiated on the at least one linear mark is orthogonal to a longitudinal axis of the at least one linear mark;
detecting means for detecting light scattered by the linear mark irradiated with the near-field light; and
signal processing means for processing a signal from the detecting means corresponding to the detected scattered light, the signal processing means comprising a control circuit having a head drive circuit for carrying out access/tracking control of the optical head and a read data output control circuit for outputting read data.

16. An information reproducing apparatus according to claim 15; wherein the plurality of linear marks comprise a plurality of linear data marks and a plurality of tracking marks disposed in overlapping relation to the plurality of linear data marks; and wherein the signal processing means further comprises a difference circuit that calculates a difference of signals for tracking and a read data signal processing circuit for processing a signal for data access, the difference circuit providing to the head drive circuit signals that control a head drive actuator that drives the optical head.

17. An information reproducing apparatus according to claim 15; wherein each of the linear marks comprises a projection having a linear edge; wherein the near-field light irradiates each projection so that the preselected polarization direction of the near-field light is orthogonal to a longitudinal axis of the linear edge of each projection; and wherein the detecting means detects light scattered by the linear edge of each projection irradiated with near-field light.

18. An information reproducing apparatus according to claim 15; wherein each of the linear marks comprises a groove having a linear edge formed in the medium; wherein the near-field light irradiates each groove so that the preselected polarization direction of the near-field light is orthogonal to a longitudinal axis of the linear edge of each groove; and wherein the detecting means detects light scattered by the linear edge of each groove irradiated with near-field light.

19. An information reproducing apparatus according to claim 15; wherein each of the linear marks comprises a plurality of substances having a linear interface and formed in a planar surface of the medium, the substances having a different optical property from that of the medium; wherein the near-field light irradiates each substance so that the preselected polarization direction of the near-field light is orthogonal to a longitudinal axis of the linear interface of each substance; and wherein the detecting means detects light scattered by the linear interface of each substance irradiated with near-field light.

20. An information reproducing apparatus according to claim 19; wherein the different optical property is a different refractive index.

21. An information reproducing method, comprising the steps of:
providing a medium having a plurality of information unit fields and a plurality of linear marks disposed in each of the unit fields in overlapping relation to one another and extending in different directions from one another;
generating near-field light by directing linearly polarized light through a fine aperture of an optical head;
irradiating at least one of the linear marks in the respective information unit field of the medium with the near-field light while controlling a direction of polarization of the near-field light so that the direction of polarization of the near-field light irradiated on the at least one linear mark is orthogonal to a longitudinal axis of the at least one linear mark;
detecting light scattered by the linear mark irradiated with the near-field light; and
processing a signal corresponding to the detected scattered light including carrying out access/tracking control of the optical head and outputting read data.

22. An information reproducing method according to claim 21; wherein the plurality of linear marks comprise a plurality of linear data marks and a plurality of tracking marks disposed in overlapping relation to the plurality of linear data marks; and further comprising the steps of calculating a difference of signals for tracking and processing a signal for data access, and providing to the head drive circuit the processed signal to control a head drive actuator that drives the optical head.

23. An information reproducing method according to claim 21; wherein each of the linear marks comprises a projection having a linear edge; wherein the irradiating step comprises irradiating each of the projections with near-field light so that the preselected polarization direction of the near-field light is orthogonal to a longitudinal axis of the linear edge of each projection; and wherein the detecting step comprises detecting light scattered by the linear edge of each projection irradiated with near-field light.

24. An information reproducing method according to claim 21; wherein each of the linear marks comprises a groove having a linear edge formed in the medium; wherein the irradiating step comprises irradiating each of the grooves with near-field light so that the preselected polarization direction of the near-field light is orthogonal to a longitudinal axis of the linear edge of each groove; and wherein the detecting step comprises detecting light scattered by the linear edge of each groove irradiated with near-field light.

25. An information reproducing method according to claim 21; wherein each of the linear marks comprises a plurality of substances having a linear interface and formed in a planar surface of the medium, the substances having a different optical property from that of the medium; wherein the irradiating step comprises irradiating each of the substances with near-field light so that the preselected polarization direction of the near-field light is orthogonal to a longitudinal axis of the linear interface of each substance; and wherein the detecting step comprises detecting light scattered by the linear interface of each substance irradiated with near-field light.

26. An information reproducing method according to claim 25; wherein the different optical property is a different refractive index.

* * * * *